United States Patent
Wintermantel

(10) Patent No.: US 8,436,763 B2
(45) Date of Patent: *May 7, 2013

(54) RADAR SYSTEM COMPRISING OVERLAPPING TRANSMITTER AND RECEIVER ANTENNAS

(75) Inventor: Markus Wintermantel, Lindau (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 296 days.

This patent is subject to a terminal disclaimer.

(21) Appl. No.: 12/994,755

(22) PCT Filed: Jul. 2, 2009

(86) PCT No.: PCT/DE2009/000945
§ 371 (c)(1),
(2), (4) Date: Nov. 24, 2010

(87) PCT Pub. No.: WO2010/000251
PCT Pub. Date: Jan. 7, 2010

(65) Prior Publication Data
US 2011/0080314 A1    Apr. 7, 2011

(30) Foreign Application Priority Data
Jul. 2, 2008    (DE) .................... 10 2008 032 070

(51) Int. Cl.
*G01S 13/00*    (2006.01)
(52) U.S. Cl.
USPC .......................................................... 342/70
(58) Field of Classification Search ............. 342/70
See application file for complete search history.

(56) References Cited

U.S. PATENT DOCUMENTS 5,008,678 A    4/1991 Herman
5,202,742 A    4/1993 Frank et al.
(Continued)

FOREIGN PATENT DOCUMENTS

DE    196 50 544    6/1997
DE    102005042729    3/2007
(Continued)

OTHER PUBLICATIONS

Daniel T. McGrath, "Calculation of Coupling Coefficients for Arrays With Skewed Lattices From Infinite Array Scan Reflection Data", IEEE Transactions on Antennas and Propagation, vol. 55, No. 7, Jul. 2007, pp. 2116-2119, IEEE Service Center, Piscataway, NJ, USA.
(Continued)

*Primary Examiner* — Jack W Keith
*Assistant Examiner* — Frank J McGue
(74) *Attorney, Agent, or Firm* — W. F. Fasse

(57) ABSTRACT

A radar system for recording the environment of a motor vehicle includes transmission antennas for emitting transmission signals, receiver antennas for receiving transmission signals reflected by objects in the environment, and a signal processor for processing the received signals. The antennas are planar and are situated on a level surface. Received signals are acquired from different combinations of the transmitter and receiver antennas. In the signal processor, the angular position of objects in a spatial direction R is estimated from the received signals, based on recognition that the received signals from an individual object have different phase positions depending on the angular position of the object in the spatial direction R. Two of the transmitter and receiver antennas overlap in the spatial direction R without coinciding, by special arrangements or configurations of the transmitter and receiver antennas.

8 Claims, 25 Drawing Sheets

U.S. PATENT DOCUMENTS

| | | | |
|---|---|---|---|
| 5,454,442 | A | 10/1995 | Labuhn et al. |
| 5,523,764 | A | 6/1996 | Martinez et al. |
| 5,530,447 | A | 6/1996 | Henderson et al. |
| 5,717,399 | A | 2/1998 | Urabe et al. |
| 5,724,042 | A | 3/1998 | Komatsu et al. |
| 5,760,886 | A | 6/1998 | Miyazaki et al. |
| 5,815,112 | A | 9/1998 | Sasaki et al. |
| 5,877,726 | A | 3/1999 | Kudoh et al. |
| 5,940,011 | A | 8/1999 | Agravante et al. |
| 5,949,365 | A | 9/1999 | Wagner |
| 6,097,332 | A | 8/2000 | Crosby, II |
| 6,127,965 | A | 10/2000 | McDade et al. |
| 6,130,640 | A | 10/2000 | Uematsu et al. |
| 6,232,910 | B1 | 5/2001 | Bell et al. |
| 6,492,949 | B1 | 12/2002 | Breglia et al. |
| 6,577,269 | B2 | 6/2003 | Woodington et al. |
| 6,657,581 | B1 | 12/2003 | Lippert et al. |
| 6,750,810 | B2 | 6/2004 | Shinoda et al. |
| 6,864,831 | B2 | 3/2005 | Woodington et al. |
| 6,897,819 | B2 | 5/2005 | Henderson et al. |
| 7,132,976 | B2 | 11/2006 | Shinoda et al. |
| 7,173,561 | B2 | 2/2007 | Isaji |
| 7,268,722 | B2 | 9/2007 | Gottwald et al. |
| 7,346,453 | B2 | 3/2008 | Matsuoka |
| 7,362,259 | B2 | 4/2008 | Gottwald |
| 7,630,061 | B2 | 12/2009 | Lehre et al. |
| 7,663,533 | B2 | 2/2010 | Toennesen et al. |
| 2001/0026237 | A1 | 10/2001 | Okai et al. |
| 2002/0163478 | A1 | 11/2002 | Pleva et al. |
| 2002/0175852 | A1 | 11/2002 | Zoratti et al. |
| 2005/0110673 | A1 | 5/2005 | Izumi et al. |
| 2005/0195383 | A1 | 9/2005 | Breed et al. |
| 2005/0231420 | A1 | 10/2005 | Brookner et al. |
| 2005/0285773 | A1 | 12/2005 | Hartzstein et al. |
| 2006/0066474 | A1 | 3/2006 | Shirakawa |
| 2006/0092076 | A1 | 5/2006 | Franson et al. |
| 2007/0152874 | A1 | 7/2007 | Woodington |
| 2007/0182619 | A1 | 8/2007 | Honda et al. |
| 2007/0205938 | A1 | 9/2007 | Zimmermann et al. |
| 2007/0222662 | A1 | 9/2007 | Toennesen et al. |
| 2007/0241978 | A1 | 10/2007 | Cheng |
| 2008/0046150 | A1 | 2/2008 | Breed |
| 2008/0303711 | A1 | 12/2008 | Matsuoka |
| 2008/0312830 | A1 | 12/2008 | Liu et al. |
| 2011/0074620 | A1 | 3/2011 | Wintermantel |
| 2011/0074621 | A1 | 3/2011 | Wintermantel |
| 2011/0080313 | A1 | 4/2011 | Wintermantel et al. |

FOREIGN PATENT DOCUMENTS

| | | |
|---|---|---|
| EP | 0 831 553 | 3/1998 |
| EP | 0 947 852 | 10/1999 |
| EP | 1 548 458 | 6/2005 |
| EP | 1 624 317 | 2/2006 |
| KR | 1020070099195 | 10/2007 |
| WO | WO2005/073753 | 8/2005 |

OTHER PUBLICATIONS

M. M. Abousetta et al., "On the use of some FMCW transmission schemes for radar angular resolution improvement", Radar 92 International Conference, Brighton UK, Jan. 1, 1992, pp. 335-339, BNSDOCID: XP006514831.

International Search Report of the International Searching Authority for International Application PCT/DE2009/000945, mailed Jan. 7, 2010, 3 pages, European Patent Office, HV Rijswijk, Netherlands.

English Translation of PCT Written Opinion of the International Searching Authority for International Application PCT/DE2009/000945, mailed Jan. 7, 2010, 5 pages, European Patent Office, HV Rijswijk, Netherlands.

Office Action in U.S. Appl. No. 12/994,752, mailed Sep. 19, 2012, 8 pages, USPTO, Alexandria, VA, USA.

Office Action in U.S. Appl. No. 12/994,754, mailed Dec. 18, 2012, 13 pages, USPTO, Alexandria, VA, USA.

Notice of Allowance in U.S. Appl. No. 12/994,748, mailed Dec. 3, 2012, 5 pages, USPTO, Alexandria, VA, USA.

Office Action in U.S. Appl. No. 12/994,752, mailed Feb. 6, 2013, 8 pages, USPTO, Alexandria, VA, USA.

US 8,436,763 B2

RADAR SYSTEM COMPRISING OVERLAPPING TRANSMITTER AND RECEIVER ANTENNAS

FIELD OF THE INVENTION

The invention relates to a radar system for use in driver assistance systems in the motor vehicle. The radar system according to the invention has overlapping transmitter and receiver antennas for reducing and/or avoiding ambiguities in angle measurement, in particular in azimuth direction.

BACKGROUND INFORMATION

Motor vehicles are increasingly equipped with driver assistance systems, which with the aid of sensor systems detect the environment and from the thus recognized traffic situation derive automatic reactions of the vehicle and/or instruct, especially warn the drivers. Here, a distinction is made between comfort and safety functions.

As a comfort function FSRA (Full Speed Range Adaptive Cruise Control) plays the most important roll in the current development. The vehicle adjusts the true speed to the desired speed predefined by the driver, provided the traffic conditions permit this, otherwise the true speed is automatically adapted to the traffic situation.

In addition to an increase of the comfort, safety functions are increasingly the focus, whereby the reduction of the braking and/or stopping distance in emergency situations plays the most important role. The spectrum of the corresponding driver assistance functions extends from an automatic priming of the brake for reducing the brake latency (pre-fill), via an improved brake assistant (BAS+) up to the autonomous emergency braking.

For driver assistance systems of the above described type radar sensor are mainly used today. Also at poor weather conditions they work reliably and can measure in addition to the distance of objects also directly their radial relative speed via the Doppler effect. As transmission frequencies, here 24 and 77 GHz are used.

The antennas of such radar systems are increasingly implemented in planar technology, since this has advantages with regard to costs and size. For the angle determination in azimuth direction both for transmission and/or reception several horizontally offset individual antennas are used and the phases of the associated received signals are evaluated. For the implementation of long-reach functions such as FSRA and collision warning it is important that the offset of the individual antennas is large enough, so that the lateral location of the objects can be determined sufficiently accurate. With known arrangements of the individual antennas they are at maximum as wide as their distance to each other. It is disadvantageous with this arrangement that ambiguities arise in the azimuth angle determination, which can lead to misinterpretations of situations, which in particular is critical for safety functions.

SUMMARY OF THE INVENTION

It is, therefore, an object of the invention to provide an inexpensive compact radar antenna system for a motor vehicle with an improved angle determination.

This object is achieved in principle with the aid of a radar system in accordance with the present invention. The improvement is achieved by a special arrangement of transmitter and receiver antennas, wherein at least two antennas consist of a plurality of elements. In an advantageous embodiment of the invention, patch antennas are used as transmitter and/or receiver antenna, wherein one antenna comprises individual antenna elements (e.g. patches) connected with each other. Here, as is described in the following in detail, by vertical offset or sloping inclination or interleaving/interlocking or sharing of individual elements, the width of the individual antennas can be designed to be larger than their distance to each other.

The advantages of the invention result by reducing or avoiding ambiguities in the azimuth angle determination, whereby misinterpretations of situations are avoided, which in particular is important for safety functions. The radar system according to invention comprises transmission means for emitting transmission signals using one or more transmitter antennas, wherein at least one transmitter antenna again comprises a plurality of elements with a phase center, and reception means for receiving transmission signals reflected at objects with one or more receiver antennas, wherein at least one transmitter antenna again comprises a plurality of elements with a phase center.

Furthermore, signal processing means are provided for processing the received signals. At least one transmitter and one receiver antenna are realized in planar technology and are arranged on a level surface. Transmitter antennas have at least each approximately the same emission characteristic, the same applies to the receiver antennas. The emission characteristic of the transmitter antennas, however, can be different to the emission characteristic of these receiver antennas.

Received signals are acquired from different combinations of these transmission and receiver antennas. In each combination at least one transmitter and one receiver antenna is active. The received signals thus result from reflected signals, which each originate from a transmitter antenna and are received by a receiver antenna. To each combination a relative phase center can be assigned, which is defined as the sum of the two vectors from a reference point to the phase centers of the respective transmitter and receiver antenna.

In the signal processing means from these received signals for objects their angular position in the spatial direction R (e.g. horizontal) is derived. These received signals of an individual object have different phase positions to each other depending on the angular position of this object in the spatial direction R. The radar system according to invention is characterized in that at least two transmitter and receiver antennas overlap with regard to the spatial direction R without being identical. This means that this is not a joint antenna for transmission and reception. This overlap is realized by at least one of the subsequent arrangements and/or configurations of these transmitter and receiver antennas:

- Antennas are offset to each other with regard to the spatial direction S which runs perpendicular to the spatial direction R, e.g. for a horizontal spatial direction R the transmitter antennas are positioned above the receiver antennas or vice versa.
- The transmitter and/or the receiver antennas have an oblique form, with regard to the spatial direction R, e.g. gaps and/or the lines of the respective planar antennas are arranged not parallel or vertical, but inclined, i.e. at an angle α with $0°<|\alpha|<90°$, to the spatial direction R.
- Antennas are interleaved with regard to the spatial direction R, as it is shown in a particular embodiment in FIG. 24.
- The use of emitting or receiving elements (e.g. patches) is common to at least two transmitter and/or receiver antennas.

In an advantageous embodiment of the invention the overlap from at least two of the transmitter and receiver antennas with regard to the spatial direction R results from the fact that for avoiding or reducing ambiguity effects during the angle estimation with regard to the spatial direction R correspondingly wide antennas are required for a corresponding narrow emission characteristic.

A special embodiment of the invention provides a radar system with transmitter and receiver antennas, which have an oblique form with regard to the spatial direction R, wherein the transmitter antennas are tilted towards the receiver antennas.

A positive embodiment of the radar system provides several transmitter antennas (number of $N_S$, preferably =2) and several receiver antennas (number of $N_E$), wherein the receiver antennas $N_E$ do not lie with regard to the spatial direction R outside of outer of these $N_E$ transmitting antennas, and each have at least approximately the same emission characteristic and with regard to their phase centers in this spatial direction R are arranged at least each approximately equidistant.

The transmitting antennas are arranged such that in the spatial direction R the distance of these $N_E$ transmitting antennas to each other is larger by the factor $N_E$ or $N_E-1$ than the distance of these $N_E$ receiver antennas to each other, whereby an arrangement with a transmitter antenna and maximum $N_S \cdot N_E$ in this spatial direction R equidistantly arranged receiver antennas is synthesized with at least approximately identical emission characteristic.

Preferably, with regard to the spatial direction R the width of the $N_S$ transmitter antennas and/or the width of the $N_E$ receiver antennas is larger than the distance of the $N_E$ receiver antennas to each other, in particular approximately by the factor 2. This effects a narrow emission characteristic of these antennas so that the effect of ambiguities in the angle formation with regard to the spatial direction R is reduced or as far as possible avoided.

In an advantageous embodiment of the invention received signals are acquired from different combinations of the $N_S$ transmitter and of the $N_E$ receiver antennas. Here, the relative phase centers of these combinations of transmitter and receiver antennas lie at least approximately equidistant with regard to the spatial direction R. The relative phase center of a combination of a transmitter and of a receiver antenna is defined as sum of the two vectors from a reference point to the phase centers of the transmitter and of the receiver antenna. With regard to the spatial direction S that runs perpendicular to spatial direction R the position of the relative phase centers of these combinations of transmitter and receiver antennas varies periodically with the period length P, if a sequence of these combinations from transmitter and receiver antennas is considered, which is arranged in the spatial direction R with regard to the position of the relative phase centers. An exemplary embodiment of such an antenna assembly is shown in FIG. 13 with the reference numeral 13.1. In the signal processing means the fact is utilized that the received signals of an object dependent on its angular position in the spatial direction S have a phase portion alternating periodically with the period length P over the combinations of transmitter and receiver antennas arranged in such manner, whereby for this spatial direction S assertions on the angular position of objects and/or on the misalignment of the radar system are possible.

In a further embodiment of the radar system according to invention, in which the spatial direction R lies horizontal and the spatial direction S vertical a measure is used in the signal processing means for detecting in particular stationary objects which can be passed from above or underneath. This measure utilizes at least one deviation with regard to the proportions resulting for received signals from only one elevation angle. Wherein in connection with the reflecting property of road surfaces the size and/or the amount, in particular each filtered over the object distance, and/or the distance-related variation of this measure is used for an at least rough estimate of the height of objects above the road surface.

An further positive embodiment of the invention provides a radar system, in which received signals are acquired from different combinations of transmitter and receiver antennas and the transmitter and receiver antennas used here each have at least approximately the same emission characteristic, wherein the emission characteristic of these transmitter antennas can be different to the emission characteristic of these receiver antennas.

With regard to the spatial direction R the position of the relative phase centers of these combinations of transmitter and receiver antennas varies periodically with the period length Q by an equidistant raster. The relative phase center of a combination of transmitter and receiver antenna is here defined as the sum of the two vectors from a reference point to the phase centers of the transmitter and of the receiver antenna.

In the signal processing means for determining the position of objects in the spatial direction R it is utilized that the received signals of an object dependent on its angular position in the spatial direction R have a phase portion alternating with the period length Q apart from a linear phase portion, if a sequence of the combinations of transmission and receiver antennas ordered in the spatial direction R with regard to the position of the relative phase centers is considered. The linear phase portion of the received signals allows for a fine, but ambiguous angle determination in the spatial direction R, the alternating phase portion allows for a rough, but clear angle determination. Consequently, with both phase portions the angle can be clearly determined with high-resolution.

DETAILED DESCRIPTION OF EXAMPLE EMBODIMENTS OF THE INVENTION

The invention is now explained on the basis of exemplary embodiments of radar systems and arrangements of their antennas. First of all, it should be noted that for images, diagrams and derivations point-shaped objects are assumed, unless explicitly extended objects are pronounced.

Figure 1:
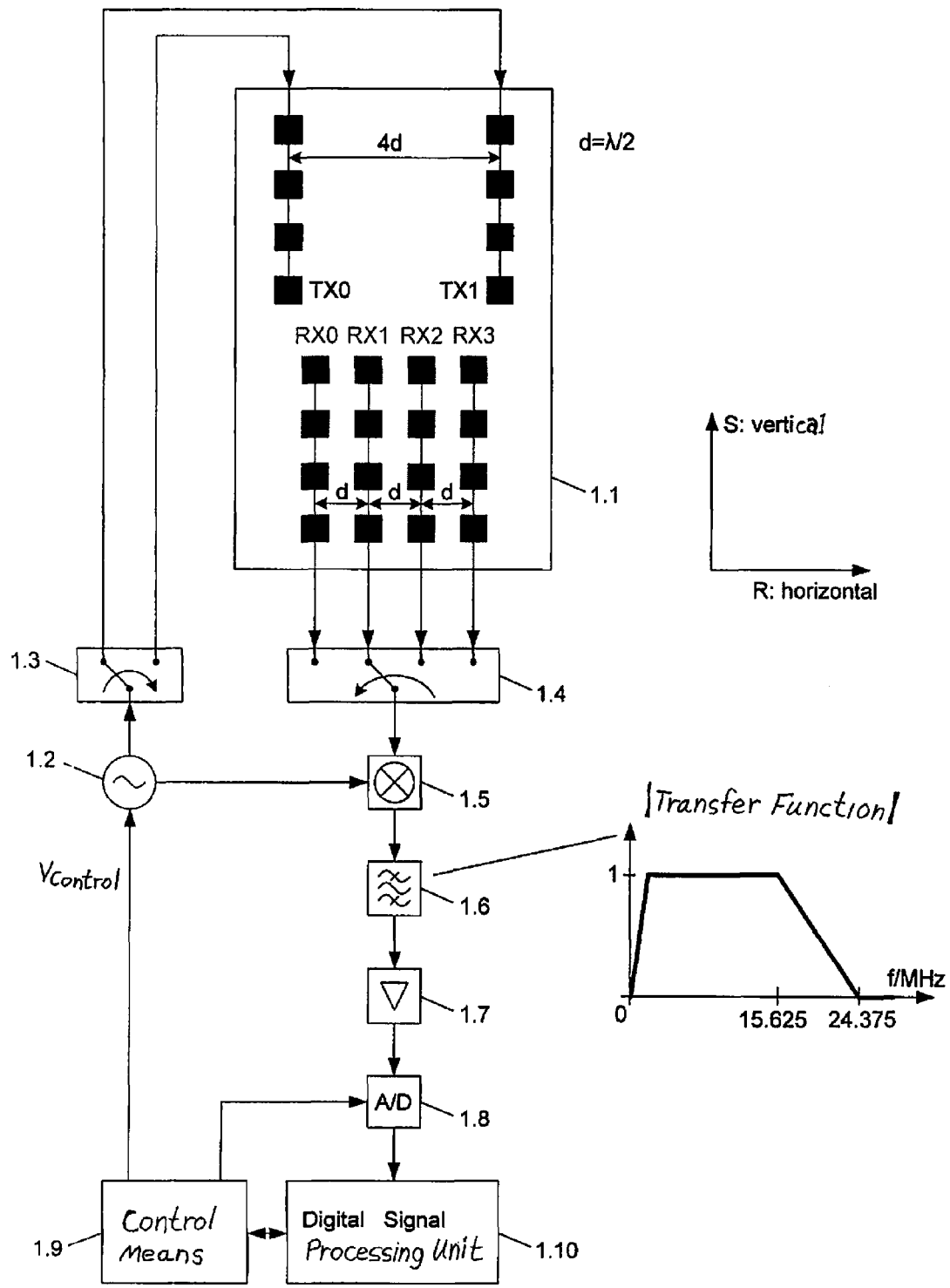
In FIG. 1 the first form of embodiment of a radar system is shown.

Embodiment 1 According to FIG. 1

At first, the exemplary embodiment of a radar system, which is roughly shown in FIG. 1 is considered. The radar system has 2 transmitter antennas TX0 and TX1 for emitting transmission signals and 4 receiver antennas RX0-RX3 for receiving transmission signals reflected at objects; the antennas are embodied as patch antennas on a planar board 1.1 in planar technology, wherein this board is oriented with regard to horizontal and vertical direction as is shown in the drawing. All antennas (transmitter and receiver antennas) have the same emission characteristic in elevation and azimuth. The 4 receiver antennas (and thus their phase, i.e. emission centers) each have the same lateral, i.e. horizontal distance D=λ/2=6.2 mm to each other, wherein λ=c/24.15 GHz=12.4 mm is the mean wavelength of the emitted signals; the horizontal distance of the two transmitter antennas to each other is 4 times as large, i.e. it amounts to 4d=2λ.

Via the multiplexers 1.3 and 1.4 in each case one of the two transmitter antennas and one of the 4 receiver antennas can be selected.

The transmission signals emitted on the respectively selected transmitter antenna are gained from the high frequency oscillator 1.2 in the 24 GHz-range, which can be changed in its frequency via a control voltage $v_{control}$; the control voltage 1.9 is generated in the control means. The signals received from the respectively selected receiver antenna are equally down-mixed in the real-valued mixer 1.5 with the signal of the oscillator 1.2 into the low frequency range. Thereafter, the received signals go through a bandpass filter 1.6 with the shown transfer function, an amplifier 1.7 and an A/D converter 1.8; subsequently they are further processed in a digital signal processing unit 1.10.

Figure 2:
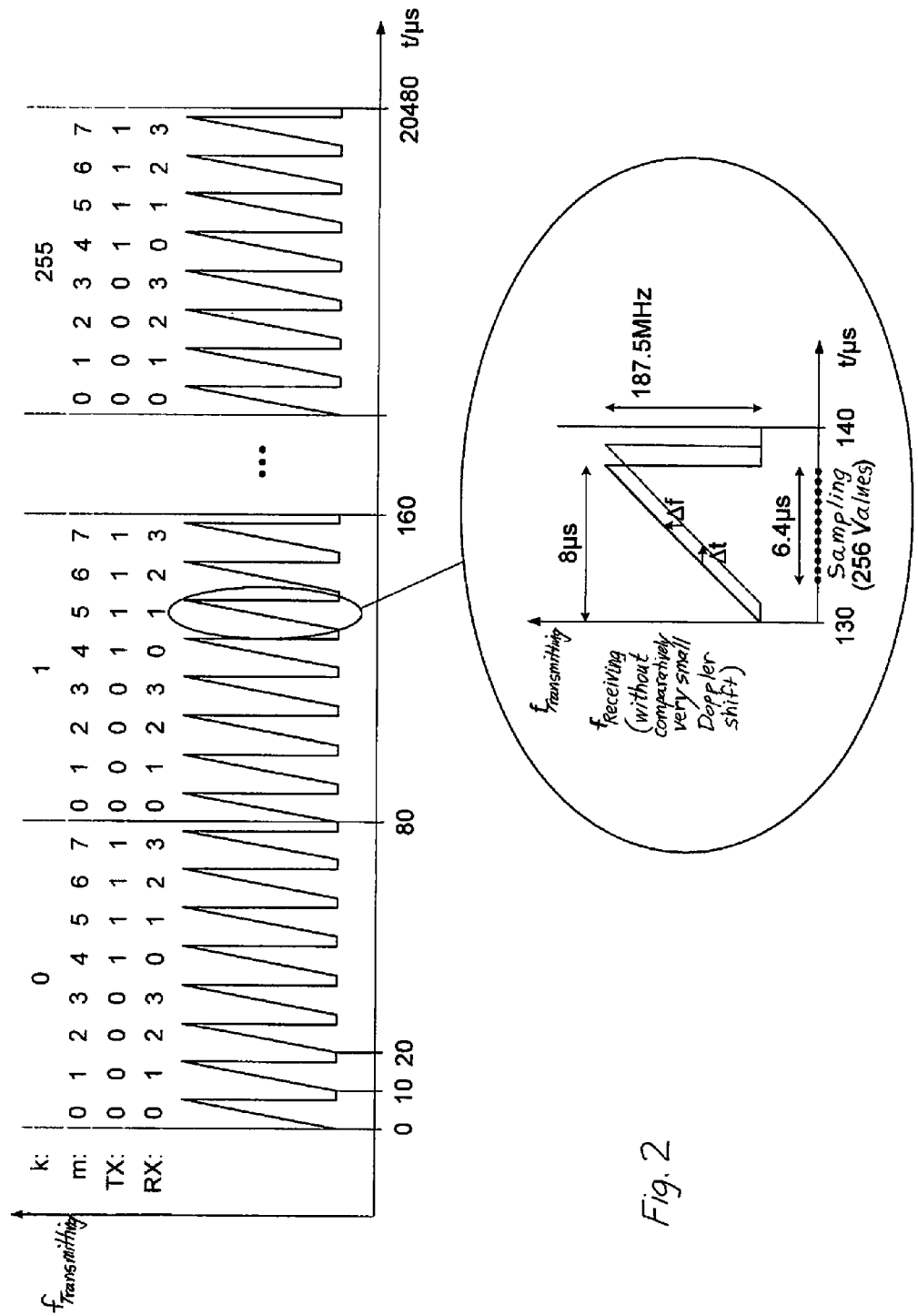
FIG. 2 shows for the first form of embodiment the frequency of the transmission and of the received signals, which consist of so-called frequency ramps, as well as the antenna combinations sequentially driven thereby.

So that the distance of objects can be measured, —as is shown in FIG. 2—the frequency of the high frequency oscillator and thus of the transmission signals is changed very quickly in linear manner (in 8 μs by 187.5 MHz); this is referred to as a frequency ramp. The frequency ramps are periodically repeated (all 10 μs); in total there are 2048 frequency ramps. Via the frequency ramps the 8 combinations of the 2 transmitter and 4 receiver antennas are periodically repeated in the order TX0/RX0, TX0/RX1, TX0/RX2, TX0/RX3, TX1/RX0, TX1/RX1, TX1/RX2 and TX1/RX3, wherein before each frequency ramp the respective next combination is selected. In FIG. 2, k is the indexed variable over the 2048/8=256 frequency ramps for each antenna combination and $m=4\cdot m_{TX}+m_{RX}$ the indexed variable over the 8 antenna combinations $TXm_{TX}/RXm_{RX}$.

The received signal of a single object is a sinusoidal oscillation after mixture and thus also at the A/D converter for each frequency ramp and each of the 8 antenna combinations; this can be explained with the aid of FIG. 2 as follows: if the object has the radial relative speed zero to the radar system, then the frequency difference Δf between the transmitted signal and the received signal is constant and proportional to signal propagation time Δt and thus proportional to the radial distance r=c·Δt/2, wherein c is the speed of light and the factor 1/2 considers that the propagation time Δt refers to the forth and back propagation of the wave; the frequency difference Δf results with the above interpretation to Δf=2r/c·187.5 MHz/8 μs=r·156.250 kHz/m. Since the received signal is real-valued mixed with the oscillator and thus with the transmission frequency, a sinusoidal oscillation with the frequency Δf results after the mixer. This frequency lies in the MHz-range and is still shifted with a non-vanishing radial relative speed by the Doppler frequency, which lies, however, only in the kHz-range and which is, therefore, approximately negligible compared to the frequency portion by the object distance. If there are several objects, then the received signal is a superposition of several sinusoidal oscillations of different frequency.

During each frequency ramp the received signal is sampled in each case 256 times at the A/D converter at the distance of 25 ns (i.e. with 40 MHz) (see FIG. 2). As is apparent from FIG. 2, a signal sampling makes sense only in the time range, where received signals of objects arrive within the receivable distance range—thus after the ramp start at least the propagation time corresponding to the maximum receivable distance must be waited for (with a maximum receivable distance of 150 m this corresponds to 1 µs).

Figure 3:
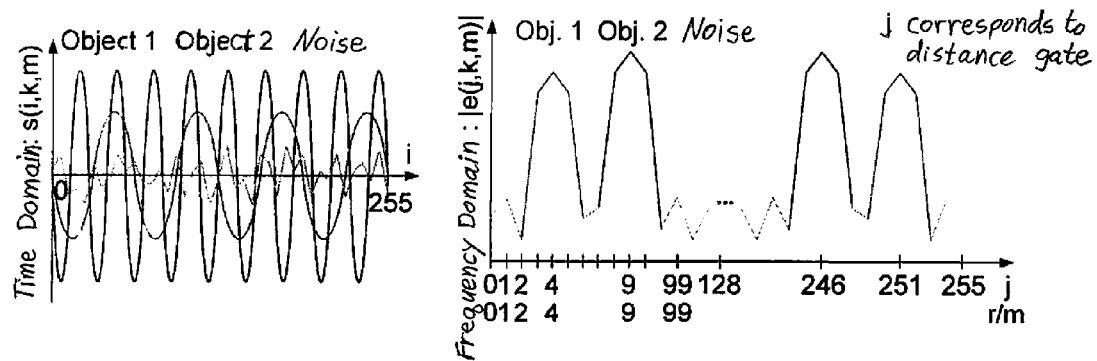
FIG. 3 shows a sampled signal with the presence of two objects before the first DFT (left) and after the first DFT (right).

Then via the 256 sampled values of each frequency ramp a Discrete Fourier Transformation (DFT) in form of a Fast Fourier Transformation (FFT) is formed. This makes it possible to separate objects in different distances, which lead to different frequencies (see FIG. 3; on the left signal before DFT with presence of two objects, on the right after DFT). Each of the discrete frequency supporting points j of the DFT corresponds to a distance r and can, therefore, analogue to pulse radars also be called a distance gate; with the above interpretation the distance gates have merely one distance and thus a width of one meter (results from r·156.250 kHz/m=1/(6.4 µs)). In the distance gates, in which the objects are located, power peaks occur in the DFT. As the sampled received signals are real-valued and the upper transition region of the analogue bandpass filter 1.5 in FIG. 1 has a frequency bandwidth of 8.75 MHz (corresponds to the range of 56 frequency supporting points), only 100 of the 256 discrete frequency supporting points can be further processed (it should be noted that it is not possible to realize any number of narrow transition regions of filters). The filter 1.5 absorbs small frequencies and thus the received signals of close objects, in order to avoid an overmodulation of the amplifier 1.6 and of the A/D converter 1.7 (the signals received at the antennas get stronger with decreasing object distance).

Figure 4:
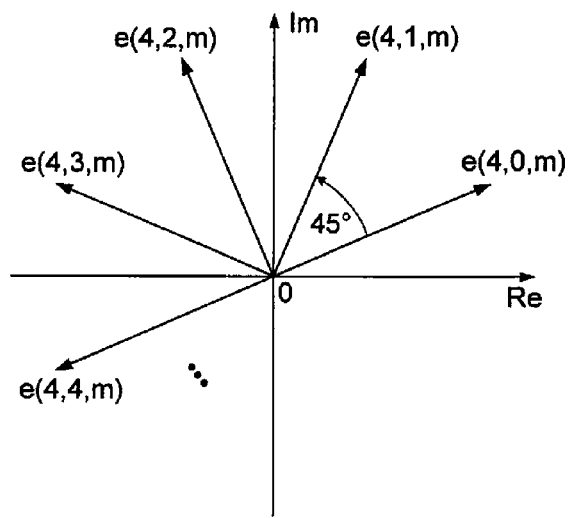
In FIG. 4 the complex spectral value rotating via the frequency ramps in the distance gate 4, in which there is exactly one object, is shown.

Over the 256 frequency ramps (k=0, 1, . . . , 255) complex spectral values e(j,k,m) result in each of the 8 antenna combinations m (m=0, 1, . . . , 7) for each distance gate j (thus each of the 100 considered frequency supporting points). If there is exactly one object in the distance corresponding to a distance gate, the complex spectral value rotates in this distance gate j over the 256 frequency ramps of each antenna combination with the Doppler frequency, since from frequency ramp to frequency ramp the distance (in the mm range or below) and thus the phase position of the assigned oscillation change uniformly (see FIG. 4; the phase change of 45° per frequency ramp represented there corresponds to a distance decrease of the object of λ/(8·2)=0.78 mm, wherein the mean wavelength λ=c/24.15 GHz=12.4 mm and the factor 2 in the denominator considers the forth and back propagation of the wave, resulting in the radial relative speed $v_{rel}$=0.78 mm/80 µs=35 km/h; positive sign of the radial relative speed is defined as an approximation). Several objects with different radial relative speed in the same distance gate are separated by the fact that a second DFT is calculated for each antenna combination and each distance gate over the complex spectral values resulting in the 256 frequency ramps. Each discrete frequency supporting point l of this second DFT corresponds to a set of Doppler frequencies (because of the sampling of the Doppler frequency it can be defined only up to an unknown integral multiple of its sampling frequency) and thus to a set of radial relative speeds $v_{rel}$ of objects, so that the discrete frequency supporting points of the second DFT can be referred to as relative-speed-gates; for linguistic simplification from this point on the addition "radial" is omitted for the radial relative speed. The second DFT does not only serve for determining the relative speed, but it increases by its integration also the detection sensitivity—with 256 frequency ramps approximately by 10⊙log$_{10}$(256)=24 dB.

Figure 5:
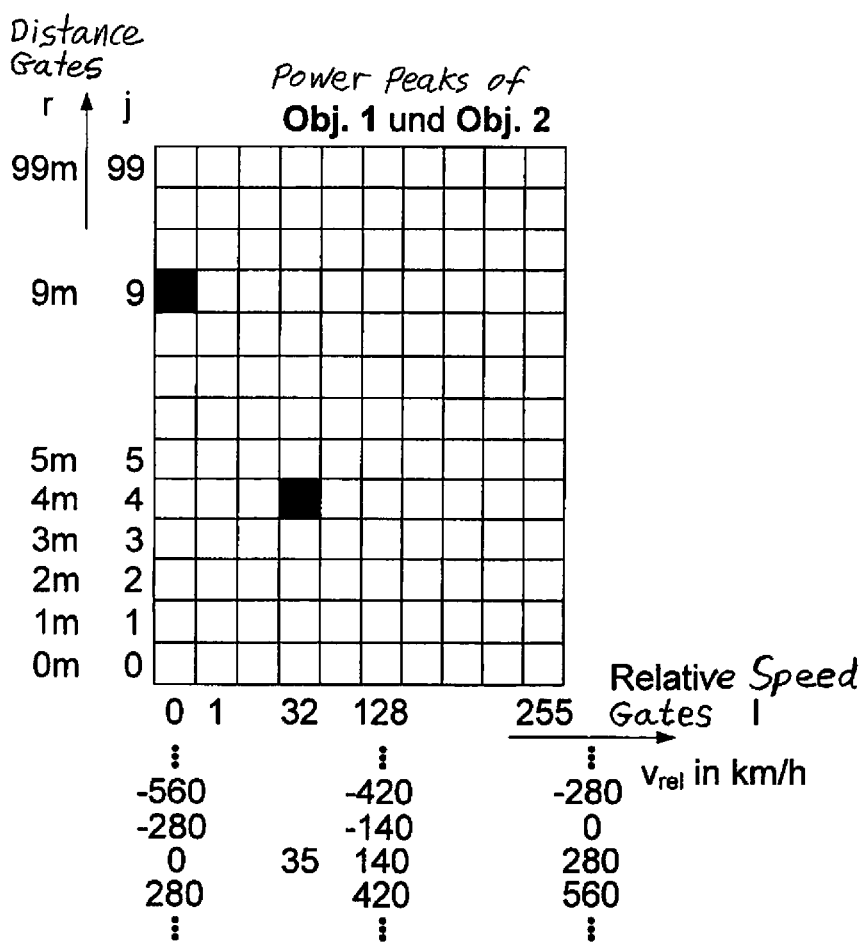
FIG. 5 shows the two-dimensional complex-valued spectrum after the second DFT.

After this second DFT for the relative speeds for each antenna combination a two-dimensional complex-valued spectrum results, wherein the individual cells can be referred to as distance-relative-speed-gates and wherein power peaks occur at the respectively assigned distance-relative-speed-gate by objects (see FIG. 5).

Figure 6:
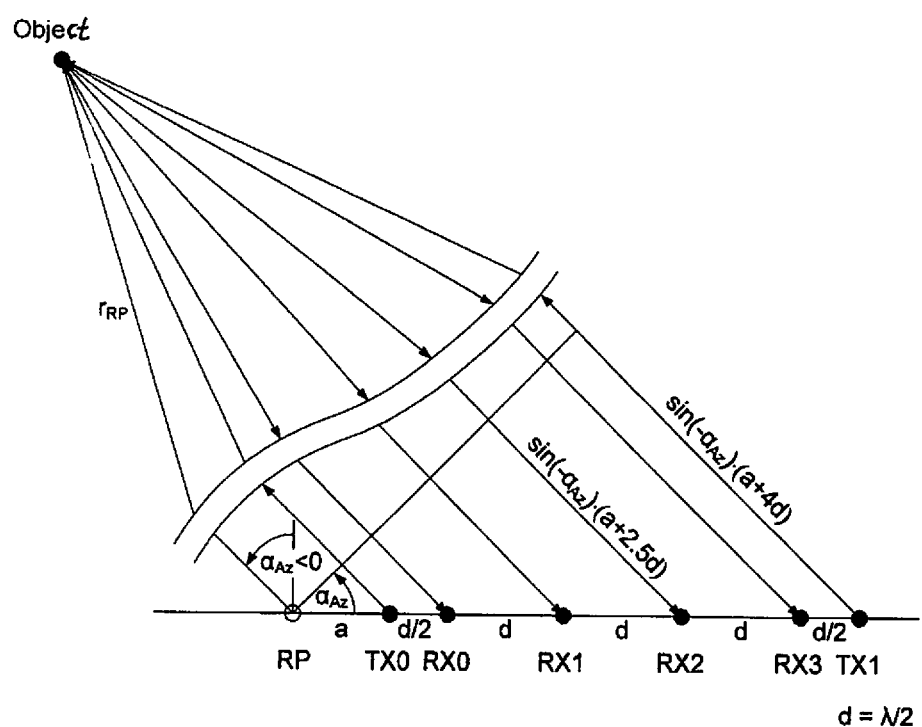
FIG. 6 shows for the antenna assembly of the first form of embodiment the different path lengths between the individual antennas and a far away object resting relative to the sensor with an azimuth angle $\alpha_{Az}<0$.

Finally, then the information from the 8 antenna combinations is merged. The waves reflected at a single object and originating from the two transmitter antennas arrive at the 4 receiver antennas dependent on the azimuth angle $\alpha_{Az}$ with different phase positions to each other, since the distances between object and transmitter and receiver antennas are slightly different. This is now explained in detail, wherein the considered object first is to rest relative to the sensor, i.e. it has the relative speed zero. In FIG. 6 in vertical projection the phase centers of the antennas as well as the beam paths to a far away object resting relative to the sensor are shown with an azimuth angle $\alpha_{Az}$<0 (positive $\alpha_{Az}$ means to the right of the perpendicular surface to the board plane) and an elevation angle $\alpha_{El}$=0 (in the horizontal perpendicular surface to the board plane); the object is so far away that the beam paths can be assumed to be parallel, this means the object is in the far field of the antenna assembly. The path length r(m) for the antenna combination m=4·$m_{TX}$+$m_{RX}$ from the transmitter antenna TXm$_{TX}$ to the object and back to the receiver antenna RXm$_{RX}$ results in $$r(m)=2\cdot r_{RP}+\sin(-\alpha_{Az})\cdot(a+m_{TX}\cdot 4d+a+d/2+$$
$$m_{RX}\cdot d)=2\cdot r_{RP}+\sin(-\alpha_{Az})\cdot(2a+d/2+m\cdot d),$$

wherein $r_{RP}$ is the path length from a reference point RP on the antenna plate to the object and a is the horizontal distance between the reference point and the transmitter antenna TX0. From this relation it can be seen that the distance changes linear with the number m of the antenna combination. The size(2a+d/2+m·d) represents the horizontal distance of the so-called relative phase center of the antenna combination m to the reference point RP and is the sum of horizontal distance of the assigned transmitter and receiver antenna to the reference point (the relative phase center of a combination of a transmitter and of a receiver antenna here is defined as a sum of the two vectors from a reference point to the phase centers of the transmitter and of the receiver antenna).

The phase difference φ(m)−φ(0) between the receiving waves for the antenna combination m=0, 1, . . . , 7 and the antenna combination m=0 results based on the different path lengths r(m) to $$\begin{aligned}\varphi(m)-\varphi(0) &= -2\pi/\lambda \cdot [r(m)-r(0)] \\ &= -2\pi/\lambda \cdot \begin{bmatrix} 2\cdot r_{RP}+\sin(-\alpha_{Az})\cdot(2a+d/2+m\cdot d)- \\ 2\cdot r_{RP}-\sin(-\alpha_{Az})\cdot(2a+d/2+0\cdot d) \end{bmatrix} \\ &= -2\pi/\lambda \cdot \sin(-\alpha_{Az})\cdot d\cdot m \\ &= 2\pi/\lambda \cdot \sin(\alpha_{Az})\cdot d\cdot m \end{aligned}$$

and thus changes likewise linear with the number m of the antenna combination. The amplitude of the signals received on the different antenna combinations is constant, since all antennas have the same emission characteristic and the distance from the antennas to the far away object for a level consideration differs only slightly.

Figure 7A:
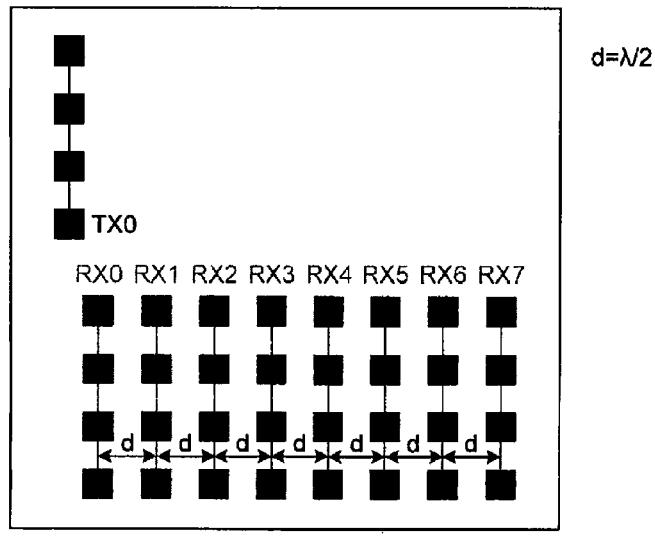
FIG. 7*a* shows an antenna assembly with transmitter and 8 receiver antennas, which is to equivalent the antenna assembly of the first form of embodiment with 2 transmitter and 4 receiver antennas.
Figure 7B:
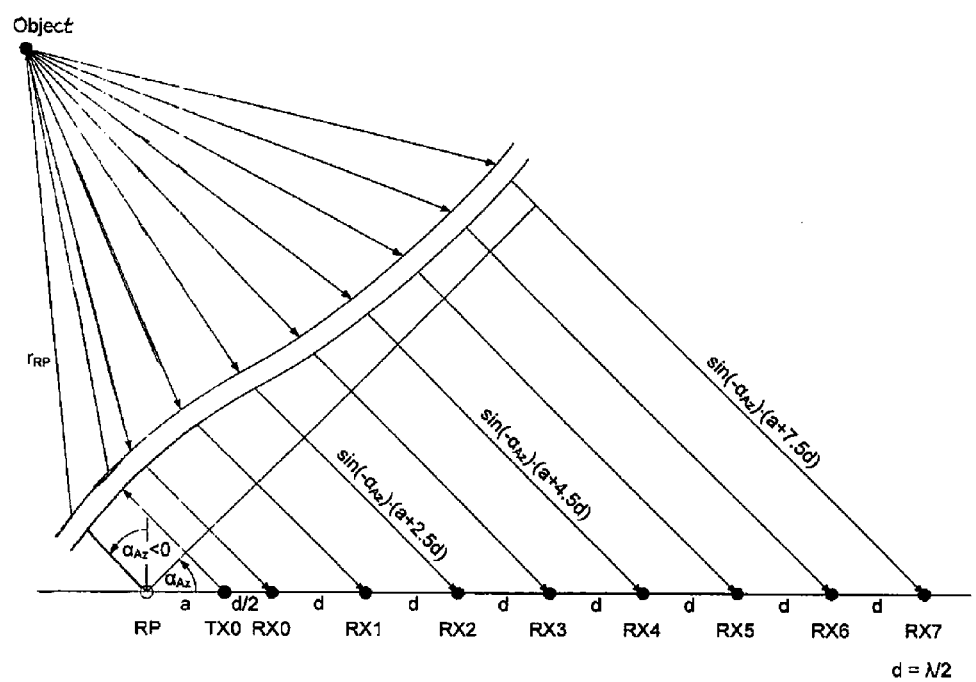
in FIG. 7*b* for this equivalent arrangement the different path lengths between the individual antennas and a far away object resting relative to the sensor is shown.

As it is directly obvious, for the antenna assembly represented in FIG. 7a with vertical projection according to FIG. 7b exactly the same relations for the path length r(m) and the phase difference φ(m)−φ(0) result as for the arrangement considered so far according to FIG. 1; the arrangement according to FIG. 7a has only one transmitter antenna TX0 and 8 equidistant receiver antennas RX0-RX7, wherein the antenna combination m=$m_{RX}$ is now formed from the transmitter antenna and the receiver antenna RXm$_{RX}$. Based on identical individual antennas and identical phase relations of the antenna combinations to each other both antenna assemblies are equivalent with regard to the angle measuring capability. However, the arrangement according to FIG. 1 represented here has the advantage that it has nearly only half the horizontal expansion compared to the conventional arrangement according to FIG. 7a, as a result of which the sensor size can be significantly reduced.

Figure 8A:
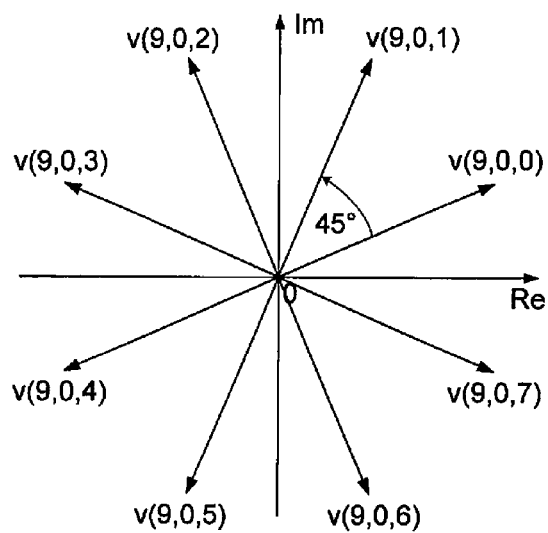
FIG. 8*a* shows for the above antenna assemblies the complex spectral value rotating via the antenna combinations in the distance-relative-speed-gate (9,0), in which there is exactly one object (resting relative to the sensor)
Figure 8B:
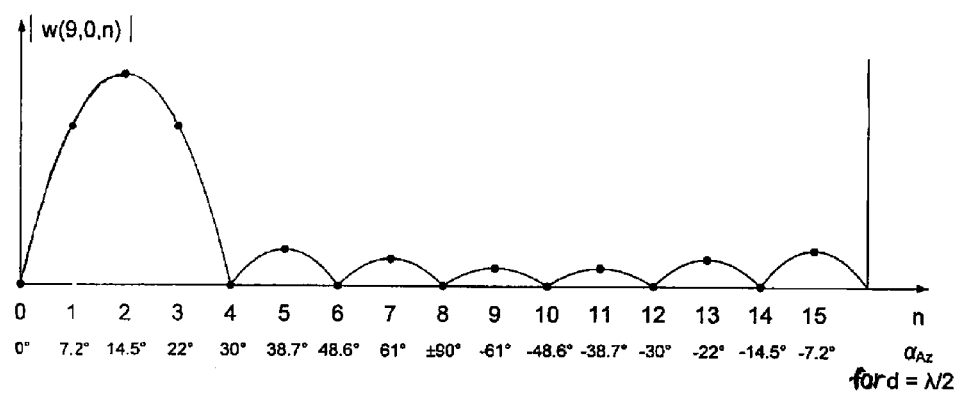
in FIG. 8*b* the amount of assigned spectrum after the third DFT is shown.

The azimuth angle-dependent phase differences φ(m)−φ(0) which are linear to and/or decreasing via the 8 antenna combinations m are remained until the second DFT apart from possible constant and thus phase shifts which can be compensated; this means that if there is only one object in a distance-relative-speed-gate (j,l), the respective complex spectral value v(j,l,m) there rotates via the 8 antenna combinations m=0, 1, . . . , 7 with constant rotational speed dependent on the azimuth angle (see FIG. 8a as an example). Hence in each distance-relative-speed-gate a digital beam formation for the azimuth direction can be performed. For this purpose sums are created via the complex values to the 8 antenna combinations, which are each multiplied with a set of complex factors with a linear changing phase; dependent on the linear phase change of the respective factor set lobes with different beam directions result. The beam width of these lobes is significantly smaller than that of the individual antennas. The above described summation is realized by a 16-point-DFT, wherein the 8 values of the 8 antenna combinations are supplemented by 8 zeros. The discrete frequency values n=0, 1, . . . , 15 of this DFT correspond to different phase differences Δφ=φ(m)−φ(m−1)=2π·n/16 between adjacent antenna combinations and thus to different azimuth angles $\alpha_{Az}$=arc sin(Δφ·λ/(2πd))=arc sin(n·λ/(16d)) and therefore can be referred to as angle gates. In FIG. 8b the amount of the course w(j,l,n) of the spectrum of the third DFT is shown for the proportions according to FIG. 8a, which refer to an object below the azimuth angle $\alpha_{Az}$=14.5° (n=2 corresponds to the represented phase difference between adjacent antenna combinations of 45°, which corresponds to π/4, and for d=λ/2 the azimuth angle $\alpha_{Az}$=arc sin(π/4)=14.5° corresponds). The third DFT does not only serve for determining the azimuth angle, but it increases by its integration also the detection sensitivity—with 8 antenna combinations approximately by 10·log$_{10}$(8)=9 dB.

So far it has been assumed for the determination of the azimuth angle that the object has the relative speed zero. If this is not the case, the phase between the antenna combinations still changes additionally in linear mode proportional to the relative speed, as the received signals of the 8 successive antenna combinations in accordance with FIG. 2 have a respective time delay of 10 µs and the distance each changes slightly during this period. Since each third DFT belongs to a distance-relative-speed-gate and thus to a certain relative speed, the linear phase change generated by the relative speed can be compensated over the 8 antenna combinations either before or after the third DFT. With a compensation before the DFT the phase of the complex input values must be shifted, with a compensation after the DFT the discrete frequency values n belonging to the output values must be shifted. Due to the above explained ambiguities for the relative speed this compensation leads to different azimuth angles dependent on the used hypothesis for the ambiguous relative speed.

Figure 9:
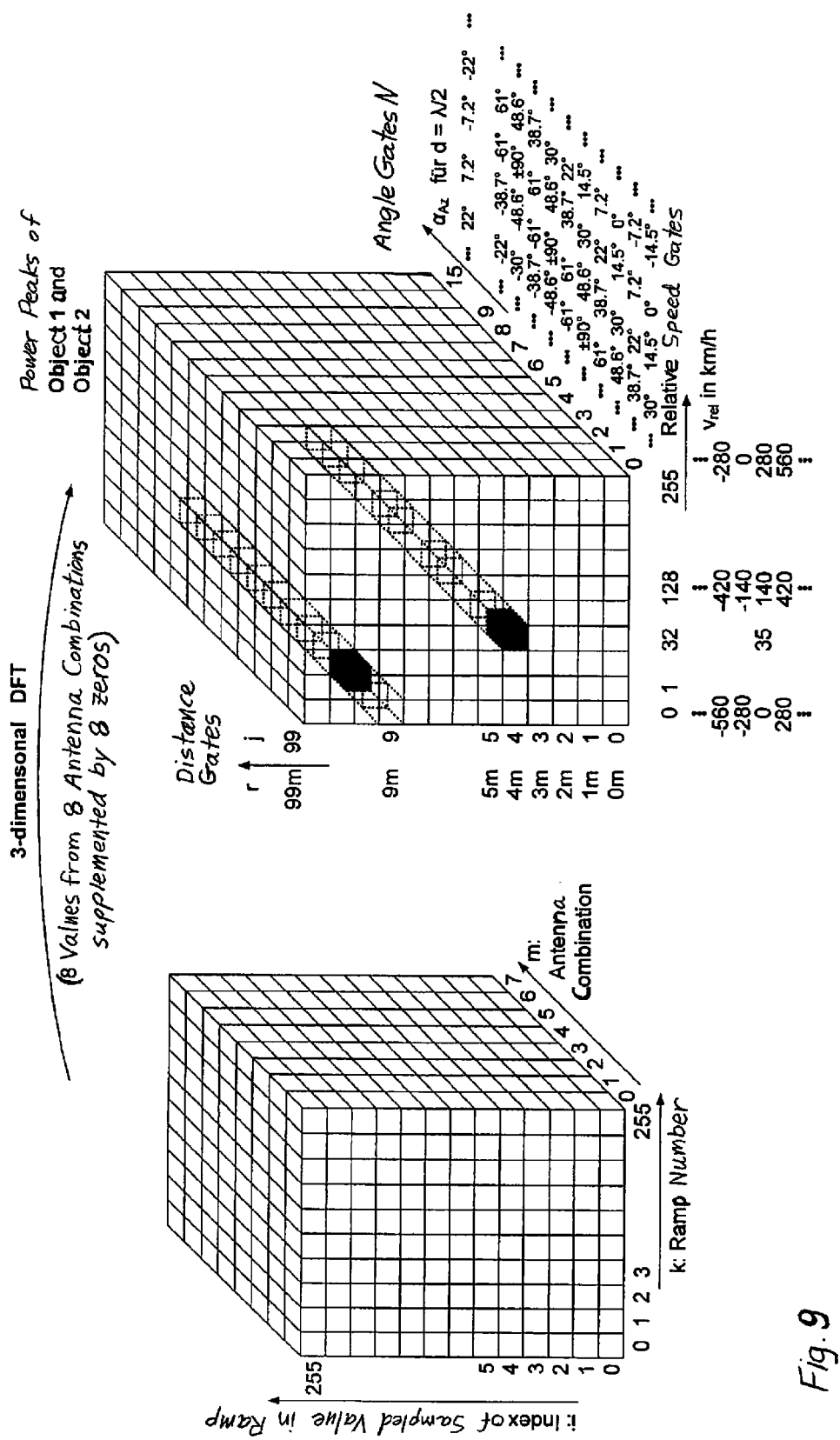
FIG. 9 shows the data before the three-dimensional DFT (left) and the three-dimensional complex-valued spectrum thereafter (right).

After this third DFT for the azimuth angles (inclusive the compensation of the linear phase change generated by the relative speed over the antenna combinations) a three-dimensional complex-value spectrum results, wherein the individual cells can be referred to as distance-relative-speed-angle gates and power peaks can occur by objects at the respectively assigned distance-relative-speed-angle-gate (see FIG. 9; on the left data before three-dimensional DFT, on the right thereafter). Thus, by determining the power peaks objects can be detected and their measures distance, relative speed (apart from possible ambiguities, see above) and azimuth angle (to each ambiguity hypothesis of the relative speed a value corresponds, see FIG. 9) can be determined. Since power peaks caused by the DFT-windowing still have levels also in adjacent cells, the object dimensions can be determined by interpolation in response of these levels still substantial more accurately than the gate width. It should be noted that the window functions of the three DFTs are selected such that on the one hand the power peaks do not get too wide (for a sufficient object separation), but on the other hand also the side lobes of the window spectra do not get too high (in order to be able to detect also weakly-reflective objects in the presence of highly-reflective objects). From the height of the power peaks as the fourth object dimension also its reflection cross section can be estimated, which indicates, how strong the object reflects the radar waves.

The described detection of objects and the determination of the assigned object dimensions represent a measuring cycle and supply a momentaneous picture of the environment; this is periodically repeated approx. all 30 ms. For judging the environment situation the momentaneous pictures are pursued, filtered and evaluated throughout successive cycles; the reasons for this are in particular:

some sizes cannot be determined directly in a cycle, but only from the change over successive cycles (e.g. longitudinal acceleration and lateral speed), the movement of objects can be checked for plausibility over several cycles, resulting in a more robust and safer description of the environment; thus e.g. the change of the distance resulting over successive cycles must comply with the measured (radial) relative speed, which results in redundancy and thus additional safety in the description of the environment, reduction of measuring noise by temporal filtration over several cycles.

Pursuing and filtering of object detections over successive cycles is also referred to as tracking. Here, for each object values for the next cycle are predicted from the tracked object dimensions of the current cycle. These predictions are compared with the objects and their object dimensions detected in the next cycle as a snapshot, in order to suitably assign them to each other. Then the predicted and measured object dimensions belonging to the same object are merged, from which result the current tracked object dimensions, which thus represent values filtered over successive cycles. If certain object dimensions cannot be clearly determined in a cycle, the different hypotheses are to be considered with the tracking. From the tracked objects and the assigned tracked object dimensions the environment situation for the respective driver assistance function is analyzed and interpreted, in order to derive from it that or the relevant objects and thus the corresponding actions.

Figure 10:
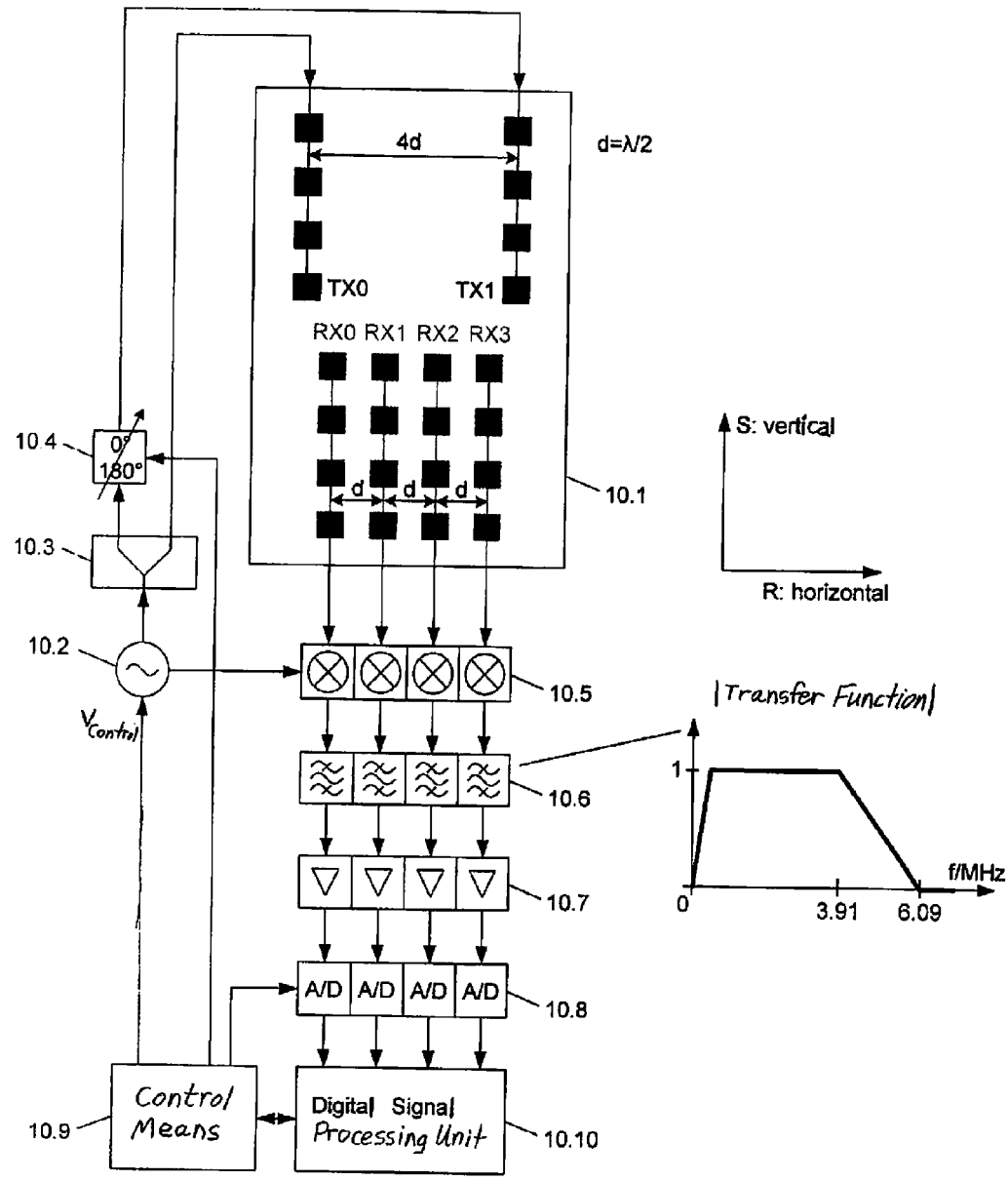
In FIG. 10 the second form of embodiment of a radar system is shown.

Embodiment 2 According to FIG. 10

Figure 11:
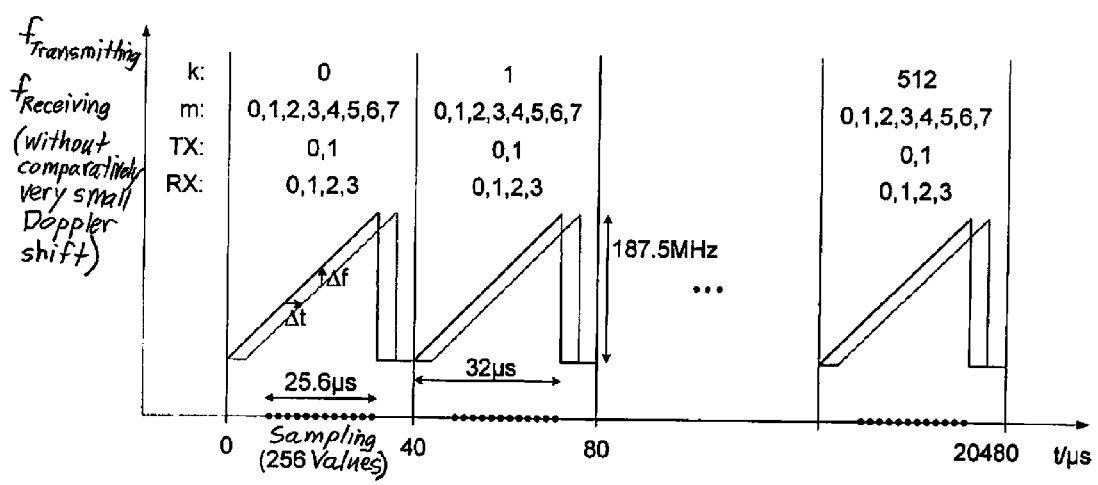
FIG. 11 shows for the second form of embodiment the frequency of the transmission and of the received signals with a parallel control of all antenna combinations.

The embodiment of the sensor according to FIG. 1 considered so far has the disadvantage that the 8 antenna combinations are sequentially operated, i.e. reception is always performed only on one antenna combination—this affects negatively the system sensitivity. The arrangement according to FIG. 10 overcomes this disadvantage. Both transmitter antennas TX0 and TX1 are parallel operated, and the signals of the 4 receiver antennas RX0-RX3 are parallel evaluated. For this purpose, the output signal of the high frequency oscillator 10.2 is applied over the power divider 10.3 simultaneously to both transmitter antennas, and on the receiving side up to the digital signal processing means there are 4 parallel channels. With each frequency ramp thus both transmitter antennas are used and the signals of all 4 receiver antennas are evaluated, wherein the frequency ramps and the sampling during the frequency ramps are now temporally stretched by the factor 4, i.e. the now 512 frequency ramps have a respective duration of 32 µs and are periodically repeated all 40 µs, and the sampling of the 256 values happens with 10 MHz, i.e. all 100 ns (see FIG. 11).

In order to be able to separate in the received signals the portions of both transmitter antennas, before the transmitter antenna TX1 the switchable inverters 10.4 is located (the switchable inverter is activated from the control means 10.9). The switchable inverter is active each second frequency ramp, i.e. with each second frequency ramp the phase position of the transmitter antenna TX1 is shifted by 180° in relation to the other frequency ramps. With this the phase of the received signals, which are generated by transmission signals of TX1 reflected at an object, alternates from frequency ramp to frequency ramp by 180° in addition to the change by the relative speed of the object. Thus before the second DFT these received signals originating from TX1 have an additional phase modulation of 180° with the period length 2, which leads with the second DFT to a displacement of the spectrum by half the DFT-length and thus 12.5 kHz.

The second DFT has now the length 512 (there are 512 frequency ramps) and is determined for the four reception channels and for each distance gate. By the phase modulation of TX1 an object in the second DFT generates in each reception channel and in the corresponding distance gate two power peaks at the distance of 12.5 kHz; the power peak at the frequency corresponding to the relative speed originates from the transmitter antenna TX0, the power peak shifted by 12.5 kHz originates from the transmitter antenna TX1. Thus the portions originating from the two transmitter antennas are separated.

For the third DFT the 8 antenna combinations are generated by the fact that for each of the 4 reception channels (of the 4 receiver antennas) the lower half (0-12.5 kHz) of the second DFT for TX0 and the upper half (12.5 kHz-25 kHz) for TX1 is used, wherein the upper half is shifted downward by 12.5 kHz on the same Doppler frequency range 0-12.5 kHz as the lower half. Thus there are again only 256 relative speed gates as with the original embodiment 1. After the third DFT it results as a single difference to the original arrangement that different hypotheses for the relative speed do no longer mean different azimuth angles, but always the same azimuth angle results (in the data cuboid of the three-dimensional DFT according to FIG. 9 the only change is that with the azimuth angle always the values belonging to the relative speed range 0-280 km/h are valid); this is reasoned by the fact that there is no more time delay between the received signals of the 8 antenna combinations.

Instead of the above explained alternate phase variation of TX1 by 180° it could be also arranged at random, i.e. from frequency ramp to frequency ramp the state of the switchable inverter is selected at random. Then the second DFT would have to be determined twice, once with and once without correction of the phase variation. In the DFT calculated with phase correction the received signals which originate from the transmitter antenna TX1 would lead to power peaks, whereas the received signals which originate from the transmitter antenna TX0 would produce for instance a noise lying approx. 27 dB below them; in the DFT calculated without phase correction the proportions would be exchanged. Thus again also a separation of both portions would be possible. The unambiguous range of the relative speed would double here.

By using 4 parallel reception channels the system sensitivity increases by 6 dB, since the bandwidth of the bandpass filters 10.6 in relation to the original embodiment is reduced by the factor 4 (the sampling during the frequency ramps is slower by a factor 4, since the frequency ramps are longer by this factor). Based on the double length 512 of the second DFT in addition this results in an integration gain higher by 3 dB. For the case that per transmitter antenna the same high power is emitted during the frequency ramps, this results in a total increase of the system sensitivity by 9 dB. If the transmission power is halved per transmitter antenna (e.g. due to the simultaneous supply of two antennas from one source or because the entire transmission line is limited due to approval regulations), this results in an increase of the system sensitivity by 6 dB.

Finally it should be mentioned that in the embodiment 2 according to FIG. 10 considered here the 4 parallel A/D converters could be replaced also by a single A/D converter with an upstream multiplexer; this A/D converter would then work with the same cycle of 40 MHz as in the original embodiment 1 according to FIG. 1.

Figure 12:
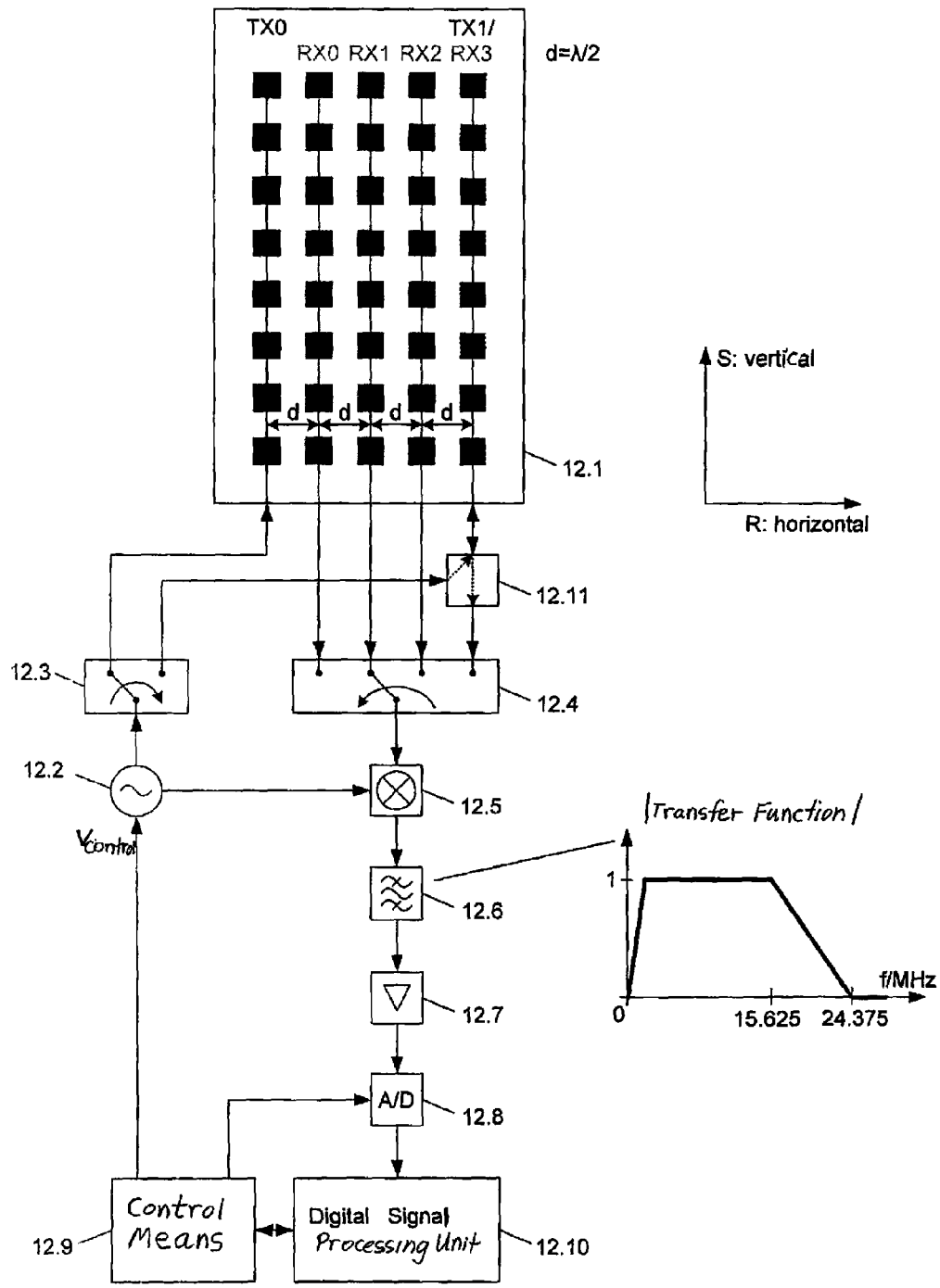
FIG. 12 shows the third form of embodiment of a radar system.

Embodiment 3 According to FIG. 12

With the arrangements according to FIG. 1 and FIG. 10 considered so far, the transmitter antennas were arranged above the receiver antennas, since with an arrangement in one level (i.e. if the transmitter antennas would have been moved downward) the patches would have contacted each other, which cannot be realized. By the arrangement of the transmitter and receiver antennas one above the other, the latter can be only approx. half as high with a predetermined sensor height as with an arrangement in a plane, which in elevation direction leads to a smaller beam focusing and thus to a smaller antenna gain. By means of this on the one hand the vertical detection range increases, which can be disadvantageous for certain functions (e.g. because bridges can be hardly distinguished from stationary vehicles), and to the other hand the system sensitivity is reduced.

This limitation in the arrangement of the antennas can be avoided by the fact that at least one antenna is used both for transmission and for reception. FIG. 12 shows as an example an arrangement, in which the right antenna is used as a transmitter antenna TX1 and receiver antenna RX3; the horizontal distance of the receiver antennas to each other is sill d=λ/2, that of the transmitter antennas is still 4d=2λ.

If the right antenna cannot work simultaneously as a transmitter and receiver antenna, but can only temporally change its function between transmitter and receiver antenna, then the eighth antenna combination of transmitter antenna TX1 and receiver antenna RX3 is not possible, so that there are only 7 antenna combinations; for the third DFT then the signal of the eighth antenna combination is to be set to zero. In the other case, thus if the right antenna can work simultaneously as a transmitter and receiver antenna, all 8 antenna combinations are possible.

So that an antenna can be used both for transmission and reception, this antenna must be connected alternately or permanently with the HF-generation and the receiving mixer; this can be realized for example with the subsequent forms of embodiment for the connecting element 12.11:

Multiplexer: antenna can change its function temporally between transmitter and receiver antenna, but cannot transmit and receive simultaneously; in the multiplexer this results typically in power losses within the range of 3 dB, Circulator: allows for simultaneous transmission and reception without power losses, however is very expensive, Coupler structures (e.g. ring coupler or Wilkinson divider): equally allows for simultaneous transmission and reception, however with power losses (3-4 dB), however, their costs are negligible, since they consist only of printed structures.

If it comes to power losses in the used connecting element and they are not compensated by a corresponding different transmission power, the receiving signals of the different antenna combinations do not have the same level; this is to be considered with the angle formation methods (e.g. with the digital beam formation) and is to be compensated, if necessary.

If in the above example according to FIG. 12 the right and the left antenna could be used each for simultaneous transmission and reception, then 9 antenna combinations with horizontally equidistant relative phase centers could be generated.

So that all antennas in their environment on the board see as similar proportions as possible, on the left and/or on the right side of the outside antennas TX0 and TX1/RX3 in the distance d=λ/2 so-called blind antennas could be arranged with the same structure as the effective antennas (i.e. an antenna column with 8 patches); these blind antennas would then have to be locked with adaptation. By way of this all antennas would be affected in same way by the respective neighbor antennas (in particular by coupling), which is more uncritical for the angle formation methods than a different impact by neighbor antennas.

Figure 13:
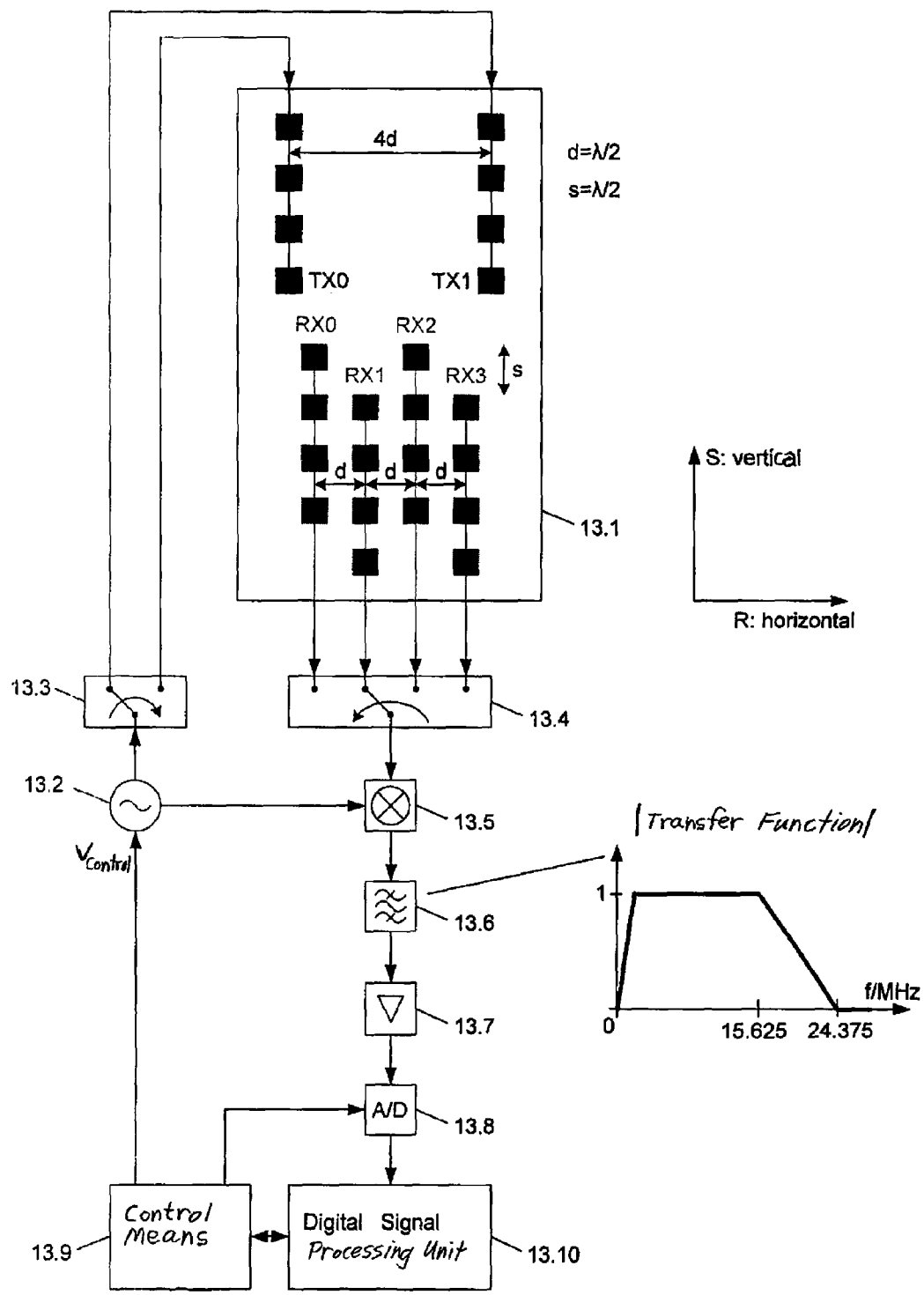
FIG. 13 shows the fourth form of embodiment of a radar system.

Embodiment 4 According to FIG. 13

For all the embodiments considered so far it was only possible to measure the azimuth angle of objects, however, not to measure the elevation angle. However, the latter would be favorable for many functions, in particular if it is to be reacted to stationary objects on the roadway (vehicles, pedestrians), in order to distinguish them from objects above the roadway (bridges, signs) or from small objects located on the roadway (e.g. can of coke) as well as from reflections of the road surface (e.g. by uneven board joints).

In order to be able to measure and/or estimate the elevation angle, the relative phase centers of the antenna combinations must have a different vertical position (the relative phase center of a combination of a transmitter and of a receiver antenna is here defined as sum of the two vectors from a reference point to the phase centers of the transmitter and of the receiver antenna). In the antenna assembly according to FIG. 13 now considered as an example the two receiver antennas RX1 and RX3 are offset downward by s=λ/2 in relation to the other two receiver antennas RX0 and RX2; otherwise the embodiment according to FIG. 13 does not differ from the original embodiment according to FIG. 1.

Figure 14:
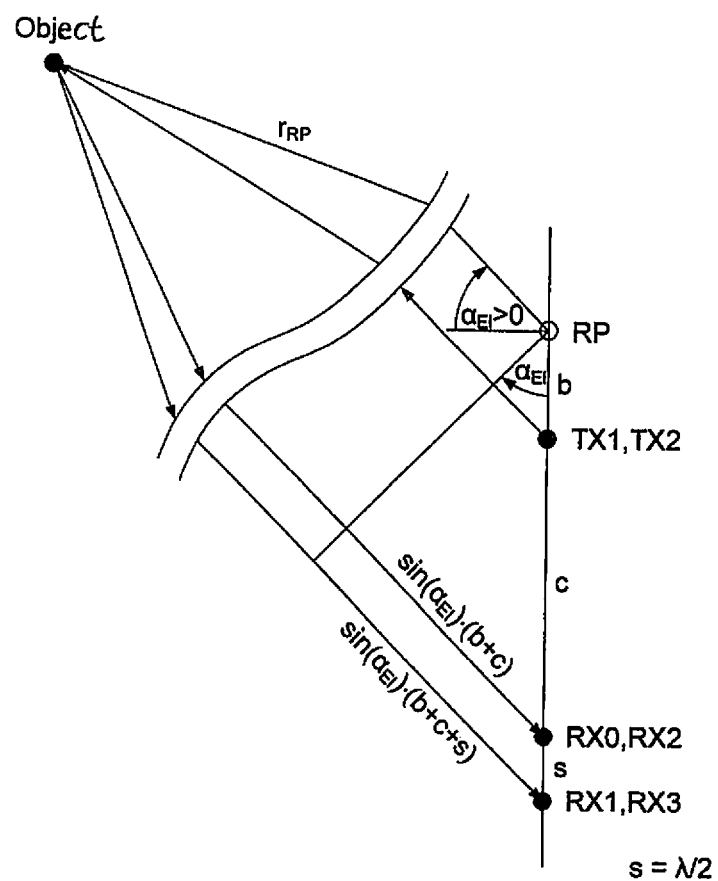
FIG. 14 shows for the antenna assembly of the fourth form of embodiment the different path lengths between the individual antennas and a far away object resting relative to the sensor with an elevation angle $\alpha_{El}<0$ and the azimuth angle $\alpha_{Az}<0$.

In FIG. 14 in horizontal projection (i.e. board 13.1 seen from the side) the phase centers of the antennas as well as the beam paths to a far away object resting relative to the sensor with an azimuth angle $\alpha_{Az}=0$ and an elevation angle $\alpha_{El}>0$ (positive $\alpha_{El}$ means above) are shown (the object is so far away that the beam paths can be assumed to be parallel, i.e. the object is in the far field of the antenna assembly). The path length r(m) for the antenna combination m=4·$m_{TX}$+$m_{RX}$ from the transmitter antenna TXm$_{TX}$ to the object and back to the receiver antenna RXm$_{RX}$ results in $$r(m) = 2 \cdot r_{RP} + \sin(\alpha_{El}) \cdot (b + b + c + \mathrm{mod}(m_{RX}, 2) \cdot s)$$
$$= 2 \cdot r_{RP} + \sin(\alpha_{El}) \cdot (2b + c + \mathrm{mod}(m, 2) \cdot s),$$

wherein $r_{RP}$ is the path length from a reference point RP on the antenna plate to the object, b is the vertical distance between the reference point and the transmitter antennas, c is the vertical offset between transmitter antennas and the two upper receiver antennas RX0 and RX2 and mod(.,2) the modulo function to 2. The size (2b+c+mod(m,2) s) represents the vertical distance of the relative phase center of the antenna combination m to the reference point RP and is the sum from the vertical distance of the assigned transmitter and receiver antenna to the reference point.

The phase difference $\Delta\phi_{El}=\phi(1)-\phi(0)$ between the received waves and thus the received signals for the antenna combinations m=1, 3, 5, 7 to the lower receiver antennas and for the antenna combinations m=0, 2, 4, 6 to the upper receiver antennas results due to the different path lengths r(m) to $$\Delta\phi_{El}=-2\pi/\lambda\cdot[r(1)-r(0)]=-2\pi/\lambda\cdot\sin(\alpha_{El})\cdot s.$$

The phase φ(m) of the received signals thus alternates with the period length 2 via the number m=0, 1, . . . , 7 of the antenna combinations by this value $\Delta\phi_{El}$. If now in addition a generally nonvanishing azimuth angle $\alpha_{Az}$ is considered, then the phase φ(m) of the received signals additionally comprises a portion linearly changing over the antenna combinations m (see in front) and results in total to $$\phi(m)=\phi(0)+2\pi/\lambda\cdot\sin(\alpha_{Az})\cdot d\cdot m-2\pi/\lambda\cdot\sin(\alpha_{El})\cdot s\cdot\mathrm{mod}(m,2).$$

Figure 15A:
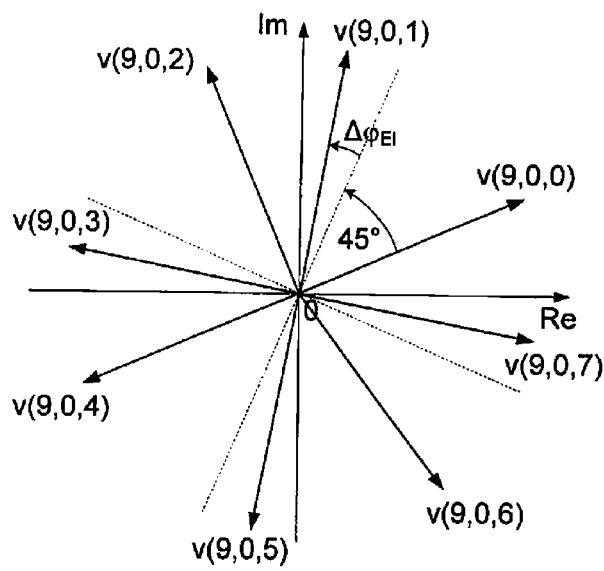
FIG. 15a shows for the proportions indicated in FIG. 14 the complex spectral value rotating over the antenna combinations in the distance-relative-speed-gate (9,0), in which there is exactly one object (resting relative to the sensor)

As far as in the assigned distance-relative-speed-gate (j,l) there is only this one object, then the complex values v(j,l,m) there after the second DFT over the 8 antenna combinations m=0, 1, . . . , 7 result in $$v(j, l, m) = K \cdot \exp\left[j \cdot \begin{pmatrix} \varphi(0) + 2\pi/\lambda \cdot \sin(\alpha_{Az}) \cdot d \cdot m - \\ 2\pi/\lambda \cdot \sin(\alpha_{El}) \cdot s \cdot \mathrm{mod}(m, 2) \end{pmatrix}\right]$$
$$= K \cdot \exp[j \cdot (\varphi(0)] \cdot \exp[j \cdot 2\pi/\lambda \cdot \sin(\alpha_{Az}) \cdot d \cdot m] \cdot$$
$$\exp[-j \cdot 2\pi/\lambda \cdot \sin(\alpha_{El}) \cdot s \cdot \mathrm{mod}(m, 2)],$$

wherein K is the constant amount of these values and exp is the exponential function; the example according to FIG. 15a resulting for a small negative elevation angle $\alpha_{El}$ shows that compared with the course v(9,0,m) represented in FIG. 8a for the original embodiment 1 now each second pointer is shifted by the phase $\Delta\phi_{El}$.

The additional factor f(m)=exp[−j·2π/λ·sin($\alpha_{El}$)·s·mod(m, 2)], effected by the offset of the receiver antennas, changes the spectrum w(j,l,n) of v(j,l,m) formed in the third DFT as is explained hereinafter. For even m=0, 2, . . . this factor has the value 1, for odd m=1, 3, . . . it has the value exp[−j·2π/λ·sin($\alpha_{El}$)·s]. The spectrum F(n) of this factor alternating with the period length 2 has two power peaks (as one can easily derive from the transformation equation), a power peak with the frequency n=0 with the average of the two values multiplied with the DFT-length N:

$$F(0)=N/2 \cdot (1+\exp[-j \cdot 2\pi/\lambda \cdot \sin(\alpha_{El}) \cdot s]),$$

and a second power peak with half the DFT-length, thus the frequency n=N/2 with the difference of the two values multiplied with half the DFT-length:

$$F(N/2)=N/2 \cdot (1-\exp[-j \cdot 2\pi/\lambda \cdot \sin(\alpha_{El}) \cdot s]).$$

The entire spectrum w(j,l,n) ensues by convolution of F(n) with the original spectrum, which has a power peak with the frequency $n_{Az}$ corresponding to the azimuth angle $\alpha_{Az}$; consequently it has two power peaks with the original frequency $n_{Az}$ and the frequency $n_{Az}+N/2$, distanced by half the DFT-length, wherein for the proportion of the complex spectral values of these two power peaks it applies:

$$w(j,l,n_{Az})/w(j,l,n_{Az}+N/2)=(1+\exp[-j \cdot 2\pi/\lambda \cdot \sin(\alpha_{El}) \cdot s])/(1-\exp[-j \cdot 2\pi/\lambda \cdot \sin(\alpha_{El}) \cdot s]).$$

Figure 15B:
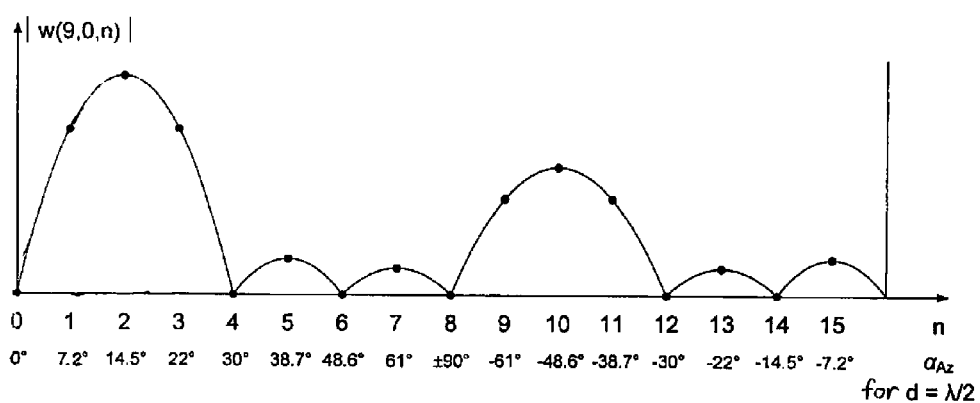
in FIG. 15b the amount of the assigned spectrum after the third DFT is shown with two power peaks distanced by half the DFT length N=16 with n=2 and n=10.

FIG. 15b shows as an example the amount of the spectrum w(9,0,n) to the course v(9,0, m) represented in FIG. 15a; apart from the power peak with $n=n_{Az}=2$ to the azimuth angle $\alpha_{Az}=14.5°$ there is a second power peak with n=10, i.e. half the DFT-length N=16 away.

Figure 16:
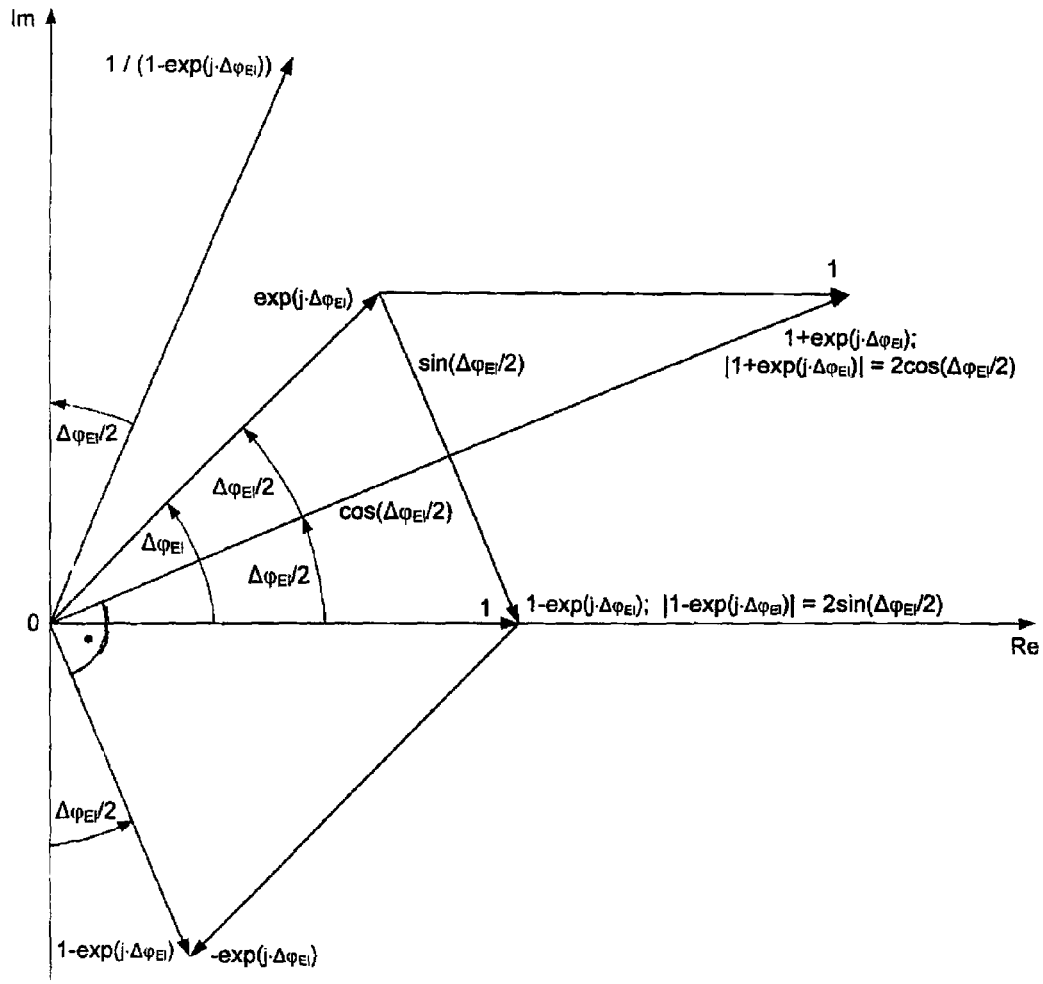
FIG. 16 shows in the complex plane the connections for the transformation of a relation for the elevation measuring capability of the fourth form of embodiment.

From the proportion $w(j,l,n_{Az})/w(j,l,n_{Az}+N/2)$ the elevation angle $\alpha_{El}$ can be determined. For this purpose the right side of the above relation is described with the aid of FIG. 16 as follows:

$$w(j,l,n_{Az})/w(j,l,n_{Az}+N/2)=\exp(j \cdot \pi/2) \cdot \cos(\Delta\phi_{El}/2)/\sin(\Delta\phi_{El}/2)=j/\tan(\Delta\phi_{El}/2)$$

with $\Delta\phi_{El}=-2\pi/\lambda \cdot \sin(\alpha_{El}) \cdot s$; by resolution of the elevation angle $\alpha_{El}$ it results for $\Delta\phi_{El} \in ]-\pi, \pi[$: $\alpha_{El}=\arcsin(-\lambda/(\pi \cdot s) \cdot \arctan[j \cdot w(j,l,n_{Az}+N/2)/w(j,l,n_{Az})])$.

Thus the elevation angle $\alpha_{El}$ in the range [−arc sin(λ/(2s), +arc sin(λ/(2s)[ corresponding to $\Delta\phi_{El}$ can be clearly determined (for the case s=λ/2 considered in the example it is thus in the range ]−90°,+90°[). However, this applies only under the condition that the frequency value $n_{Az}$ to the azimuth angle $\alpha_{Az}$ is known. Since, however, to an object there are generally two power peaks with half DFT length distance, there are two hypotheses for the azimuth angle with respectively different elevation angle. With the aid of the tracking (i.e. the observation of objects over several cycles) with the movement of the own vehicle it can be generally recognized, which hypothesis is the right one, since only for a hypothesis a useful course of the object place results.

For ideal conditions (no noise and a point-shaped reflective object) in the above function the argument of the arctan function is real-valued, for other conditions it generally has, however, still another complex-valued portion; by using the subsequent relation this portion is ignored:

$$\alpha_{El} = \arcsin(-\lambda/(\pi \cdot s) \cdot \arctan$$
$$[\text{Re}(j \cdot w(j, l, n_{Az} + N/2)/w(j, l, n_{Az}))])$$
$$= \arcsin(\lambda/(\pi \cdot s) \cdot \arctan[\text{Im}(w(j, l, n_{Az} + N/2)/w(j, l, n_{Az}))]),$$

Re and/or Im representing the real and/or imaginary part of the respective argument.

If in a distance-relative-speed-gate with an azimuth angle there are several reflections from different elevation angles (with strongly expanded objects and/or because of reflections at the road surface, see below), then they cannot be dissolved, i.e. separated by the above formula for determining the elevation angle; by a significant complex-valued portion in the size $j \cdot w(j,l,n_{Az}+N/2)/w(j,l,n_{Az})$ it can only be recognized that there must be reflections from significant different elevation angles.

The represented approach for the measurement and/or estimation of elevation angles can be interpreted also in such a way that into the digital beam formation for the azimuth angle a mono-pulse method for the elevation angle is incorporated (mono-pulse method means that by phase comparison of two offset antennas (groups) an angle is determined). This approach has the advantage that on the one hand all evaluation methods (such as e.g. the simple digital beam formation with a DFT) based on equidistant receiver antennas can be maintained and that on the other hand for the azimuth angle there are no losses for the accuracy and only small losses for the separation capability (the latter applies only with objects with an azimuth angle distance corresponding to half the DFT length, if for the objects a position outside of the horizontal plane is possible); with a conventional approach for a simultaneous angular measurement in azimuth and elevation, which comprises for the antenna combinations two groups one above the other without horizontal offset to each other, with an equal number of antenna combinations this would result in that the accuracy and separation capability for the azimuth angle would be halved.

It should be noted that the periodic vertical offset of the antenna combinations can in principle also be embodied with a higher period length P than 2. As a result of an object outside of the horizontal plane then in general P power peaks with a respective distance N/P arise in the spectrum, wherein N is the DFT-length of the digital beam formation; from the values of these power peaks again the elevation angle can be determined, wherein now even a separation capability of objects via the elevation angle will be possible. By such an approach two digital beam formations (for azimuth and elevation) are superimposed in a DFT.

It is to be stressed that the approach presented here for an elevation measuring capability is essentially cost-neutral.

Figure 17:
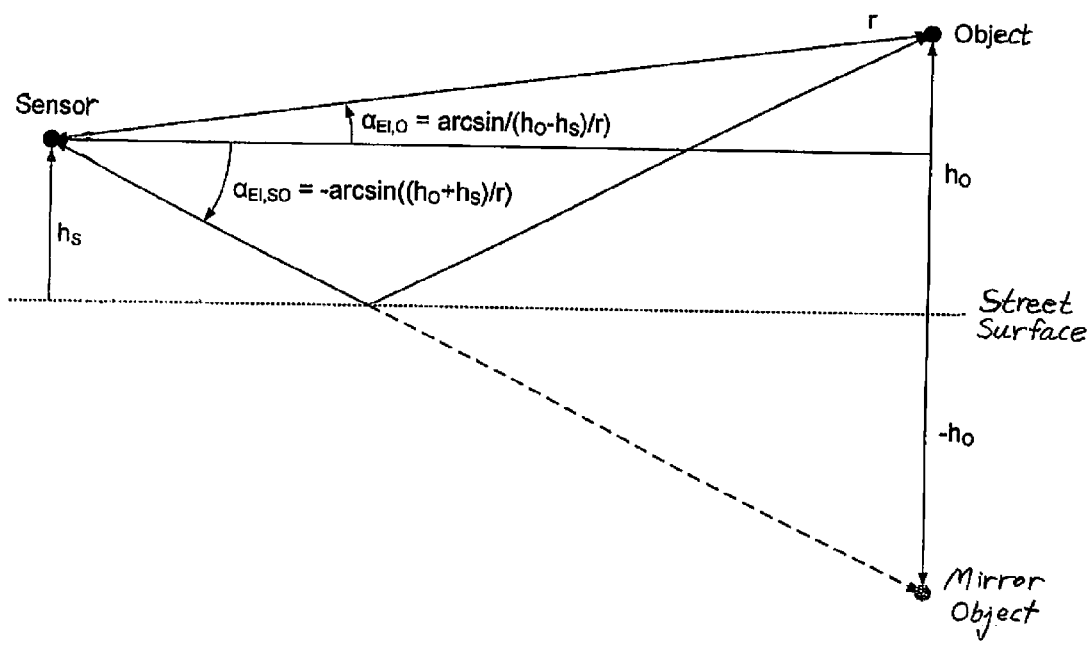
FIG. 17 illustrate the reflecting effect of the road surface.

In a real environment it is to be considered for the elevation measurement that the road surface has a reflecting property; this is shown in FIG. 17. An object receives transmission power on a direct and on a path reflected at the road surface. For the power reflected at the object and received by the sensor there are equally both ways; thus the sensor in addition to the real object sees a mirror object, which has approximately the same (radial) distance as the real object, but lies by the height $h_O$ of the real object underneath the road surface. Dependent on the height $h_S$ of the sensor above the road surface the real and the mirror object have a different amount of the elevation angle, wherein the difference decreases with an increasing distance. The phase of the received signals of real and mirror object are generally different, since they slightly differ in their distance; this phase difference changes above the distance r of the real object. The described effects are the stronger pronounced, the higher the real object is located above the road surface.

Figure 18A:
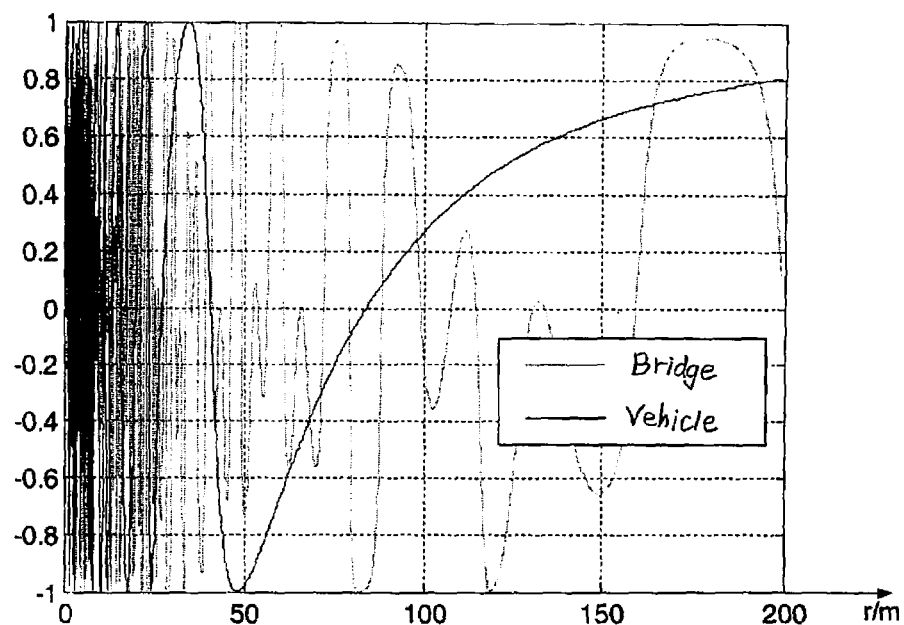
FIG. 18a shows the relative imaginary part of the proportion V and FIG. 18b its absolute imaginary part each along the distance r for a vehicle (average height $h_O=0.5$ m, vertical expansion 0.3 m) and a bridge (average height $h_O=5$ m, vertical expansion 0.3 m), wherein the sensor height is $h_S=0.5$ m.

At least for far away objects the real and mirror object are in the same distance-relative-speed-gate; they have the same azimuth angle, but different elevation angles. For the period length 2 considered above as an example for the vertical offset of the receiver antennas both objects cannot be dissolved; on average the reflection focus lies approximately on the height of the road surface. By a significant complex-valued portion in the proportion $V=j \cdot w (j,l,n_{Az}+N/2)/w (j,l,n_{Az})$ it can be recognized, however, that there must be objects in significantly different elevation angles. Since the phase difference between the received signals of real and mirror object changes over the distance, over the distance also the complex-valued portion of the proportion V and thus the size Im(V)/|V| varies, which in the following is to be referred to as relative imaginary part of V. The distance-related variation of the relative imaginary part of V is the higher, the higher the real object is located above the road surface. Apart from the close range this criterion can be utilized for the distinction of relevant objects on the roadway (e.g. vehicles and pedestrians) and objects which can be passed from underneath (i.e. objects above the roadway such as e.g. bridges and signs); e.g. as of a certain distance-related variation of the relative imaginary part of V this points to an object which can be passed from underneath. FIG. 18a shows as an example the relative imaginary part of the proportion V over the distance r for a vehicle (medium height $h_O$=0.5 m, vertical expansion 0.3 m) and a bridge (average height ho=5 m, vertical expansion 0.3 m), wherein the sensor height is $h_S$=0.5 m.

Furthermore, this criterion can also be used in the closer range to distinguish relevant protruding objects on the roadway (e.g. vehicles and pedestrians) on the one hand and on the other hand smaller objects (e.g. can of coke) lying on the road and thus being able to be driven over as well as unevenness of the road surface (e.g. by offset board joint). For not or only slightly protruding objects on the roadway the distance-related variation of the relative imaginary part of V is much smaller than for significantly protruding objects. Besides, in the close range also the actually measured elevation angle can be used, in particular as by the elevation beam focusing the reflections of a real protruding object are significantly larger than the reflections of its mirror object, so that approximately the actual angle of the real object is measured, from which approximately its real height can be determined.

Figure 18B:
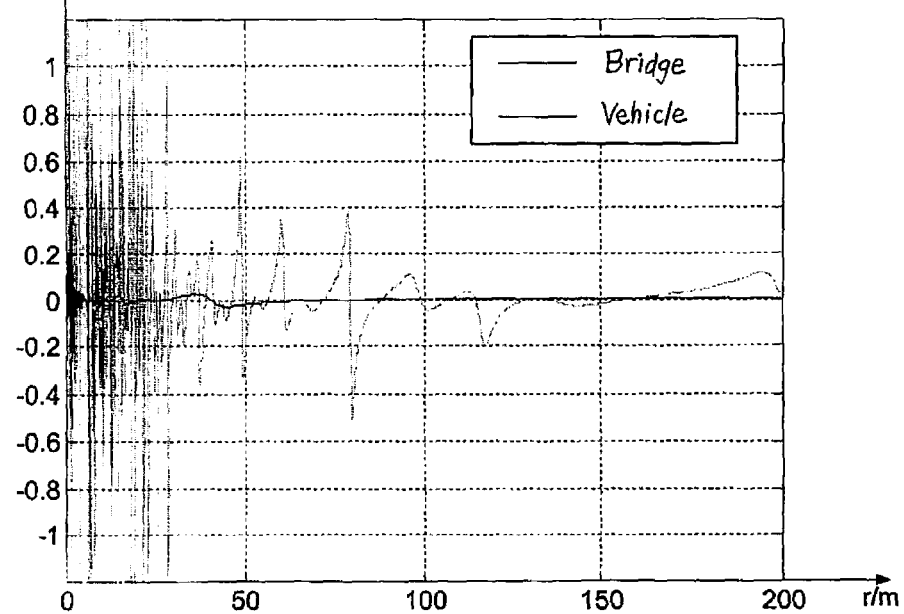

Apart from the relative imaginary part of the proportion $V=j \cdot w(j,l,n_{Az}+N/2)/w(j,l,n_{Az})$, in principle also any other measure can be used, which has at least one deviation in relation to the proportions resulting from only one reflection from an elevation angle, to derive thereof a criterion for recognizing objects which can be passed from underneath or above. Thus, e.g. also only the absolute imaginary part Im(V) of the proportion V can be used. The amount of this measure Im(V), in particular filtered via the object distance, and its distance-related variation are the higher, the higher the real object is located above the road surface; the filtration of the amount over the object distance can be linear (e.g. average over a distance section) or nonlinear (e.g. maximum over a distance section). FIG. 18b shows as an example the imaginary part of the proportion V over the distance r for a vehicle (average height $h_O$=0.5 m, vertical expansion 0.3 m) and a bridge (average height $h_O$=5 m, vertical expansion 0.3 m), wherein the sensor height is $h_S$=0.5 m.

Furthermore, naturally not only one, but also several measures can be used, which each utilize at least one deviation in relation to the proportions resulting with only one reflection from an elevation angle, in order to derive thereof a combined criterion for recognizing objects which can be passed from underneath or above.

The elevation measuring capability can also be used for recognizing and if necessary for correcting a misalignment of the sensor in elevation direction and/or for monitoring its elevation orientation. For determining the actual elevation orientation only moved objects which are sufficiently far away are suitable, since moved objects (vehicles) apart from few special cases lie for instance on the same height as the own vehicle and in sufficient distance the road reflections have only little influence on the measured elevation angle, since the elevation angles of the real and mirror object differ only little (how far the objects have to be away depends on the required accuracy for the determination of the elevation orientation. Stationary objects, in contrast, are not suitable since they can lie in different elevation angles (on or above the roadway).

If on average for moved objects far away an elevation angle unequal 0° is measured, then the sensor shows a misalignment by this average measured elevation angle, as other vehicles on average are located approximately in horizontal direction to the own vehicle, i.e. with a real elevation 0°; for example the sensor for an average measured elevation angle of +2° (for a sensor objects lie approx. 2° above the roadway) looks approx. 2° downward.

The averaging via measured elevation angles of several objects can be effected either linear, i.e. by weighted averaging, however, nonlinear averaging is more suitable, which reduce the influence of outliers in a series of measurements—the median is mentioned as an example.

Outliers in the measured elevation angle with the moved objects used for determining the elevation orientation can in principle be avoided to the majority by e.g. the subsequent measures:

Only objects are taken, which move on the roadway of the own vehicle; thus no other roadways which are offset in height to the own roadway can have an influence.

The elevation measurement is distorted by reflections at tunnel slabs and at the bottom sides of bridges; this, however, can be mostly recognized by a significant complex-valued portion in the proportion $V=j \cdot w(j,l,n_{Az}+N/2)/w(j,l,n_{Az})$. Hence such objects are not to be used. If such objects are recognized, also for safety reasons for a certain period of time no objects can be used for averaging.

If in the system there are still other tunnel recognition mechanisms, basically when recognizing a tunnel no object can be used.

If a misalignment of the sensor in elevation is recognized, this can be easily out-calibrated; for this purpose only each second of the values resulting over the 8 antenna combinations before the third DFT is to be turned by a corresponding phase value.

Embodiments 5-10 According to FIGS. 21-26

The embodiments considered so far have only one column per individual antenna (thus per transmitter and receiver antenna), whereby they emit very wide in horizontal direction (azimuth). Such arrangements are typically used for close range sensors, since they must have a wide horizontal detection range, but, however, do not have a large reach. The horizontal distance d=λ/2 of the receiver antennas to each other is selected so small that the association between the phase differences Δφ=π·sin($α_{Az}$) of adjacent antenna combinations and the azimuth angle $α_{Az}$ in the azimuth range ]−90°,+90°[ is clear (a phase shift caused by the elevation angle with vertically offset antennas, is considered not here).

Remote range sensors opposite to close range sensors have the requirement of a higher reach and thus a system sensitivity as well as a higher measurement accuracy and a separation capability for the azimuth angle; in return the horizontal detection a may be restricted. In order to realize these requirements, the distance of the antennas to each other is increased (e.g. by the factor 3 in relation to the previous interpretation, so that the distance between the receiver antennas amounts to d=3λ/2 and the distance between the transmitter antennas to 4d=6λ.) With this on the one hand antennas with several columns and thus stronger focusing in azimuth direction can be realized, resulting in a higher antenna gain and thus a higher system sensitivity (at the expense of a reduced azimuthal detection range), and on the other hand the azimuth angle-caused phase differences $\Delta\phi=2\pi d/\lambda \cdot \sin(\alpha_{Az})$ of adjacent antenna combinations have a corresponding greater impact, which increases the measurement accuracy and separation capability for the azimuth angle.

Figure 19:
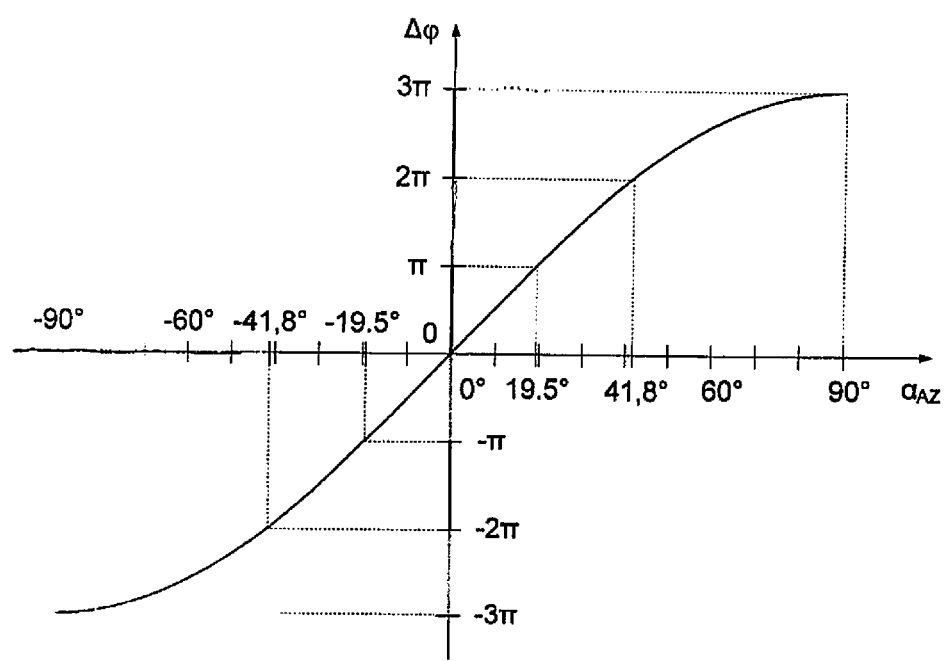
In FIG. 19 the connection $\Delta\phi=3\pi\cdot\sin(\alpha_{Az})$ resulting for $d=3\lambda/2$ between phase difference $\Delta\phi$ and azimuth angle $\alpha_{Az}$ is shown.

The connection $\Delta\phi=3\pi \cdot \sin(\alpha_{Az})$ resulting for $d=3\lambda/2$ between the phase difference $\Delta\phi$ and azimuth angle $\alpha_{Az}$ is shown in FIG. 19; now a change of the phase difference of $6\pi$ corresponds to the azimuth angle range $-90°\ldots90$. However, as phases can be measured only up to an unknown integral multiple of $6\pi$, it comes to ambiguities—thus e.g. it cannot be distinguished between the azimuth angles $-41.8°$, $0°$ and $+41.8°$, as they are measured with a phase difference $\Delta\phi=0$.

Figure 20A:
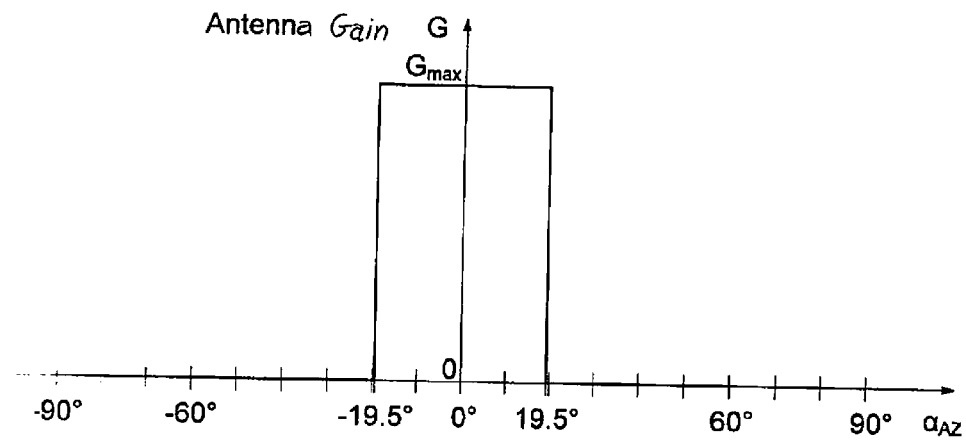
FIG. 20a shows an ideal antenna diagram with azimuthal detection range −19.5 . . . +19.5.
Figure 20B:
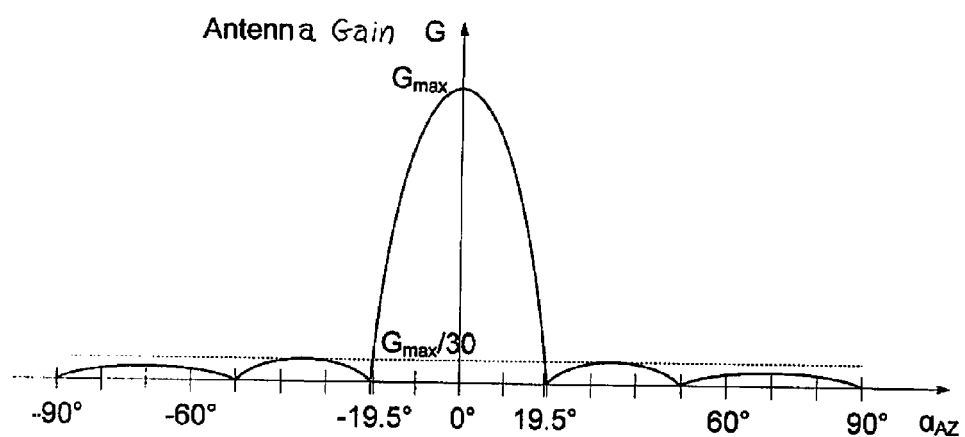
FIG. 20b shows a realizable antenna diagram for such a detection range with at least 15 dB suppression outside.

These ambiguities are avoided, if the individual antennas for transmission and/or reception only have an azimuthal detection range limited in such a manner that hereto corresponds a change of the difference phase $\Delta\phi$ of maximum $2\pi$. For the above numerical example this requirement can be complied with by the azimuthal detection range $-19.5\ldots+19.5$. In FIG. 20*a* a corresponding ideal antenna diagram is shown, which suppresses any transmission and/or reception for azimuth angles outside of this range. In reality such antenna diagrams with sharp detection limits and complete suppression cannot be generated outside. FIG. 20*b* shows a realizable antenna diagram, which outside of the azimuth range $-19.5\ldots+19.5$ has at least 15 dB suppression. On system level a suppression of the double value 30 dB results, provided that the antennas have such an antenna diagram both for transmission and for reception. With this only for very strong reflective objects it can come to ambiguities for the azimuth angle.

Figure 21:
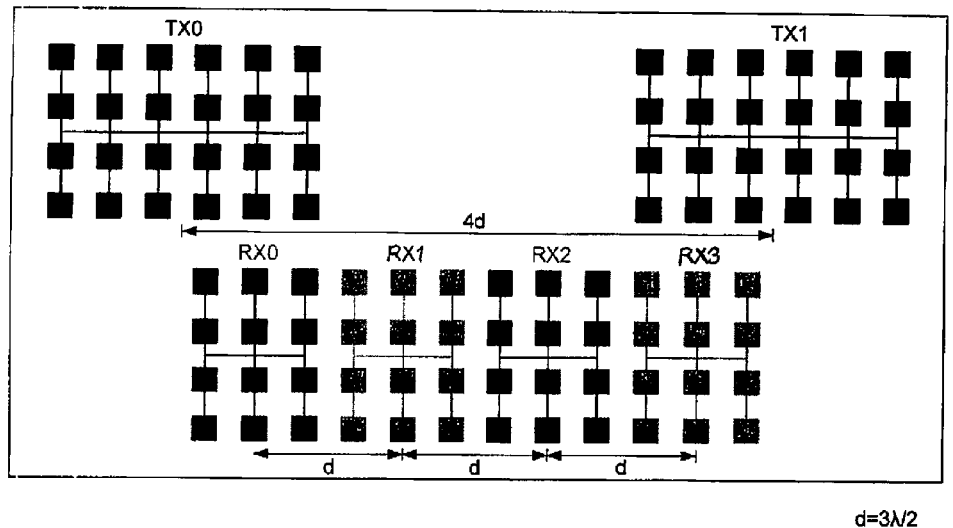
FIG. 21 shows the antenna assembly of a fifth form of embodiment of a radar system.

In order to largely avoid the ambiguities for the azimuth angle by an accordingly limited azimuthal detection range of the antennas for transmission and/or reception, when seen horizontally the width of these antennas must be at least about twice as large as the distance d of horizontally successive receiver antennas. For compliance with this requirement in the following five different approaches for planar antennas are introduced:

The transmitter antennas when seen vertically are arranged in another plane (i.e. in another range) than the receiver antennas, i.e. they lie one above the other (see FIG. 21 as an example). Thus the horizontal width of the transmitter antennas can be selected up to four times higher than the distance d of the horizontally successive receiver antennas. In the example according to FIG. 21 only the transmitter antennas have the required narrow azimuthal detection range, however, not the receiver antennas; thus for stronger reflective objects it can still come to ambiguities for the azimuth angle. It should be noted that FIG. 21 represents an example for the fact that form and emission characteristic of the transmitter antennas may in principle be different from the form and emission characteristic of the receiver antennas.

Figure 22:
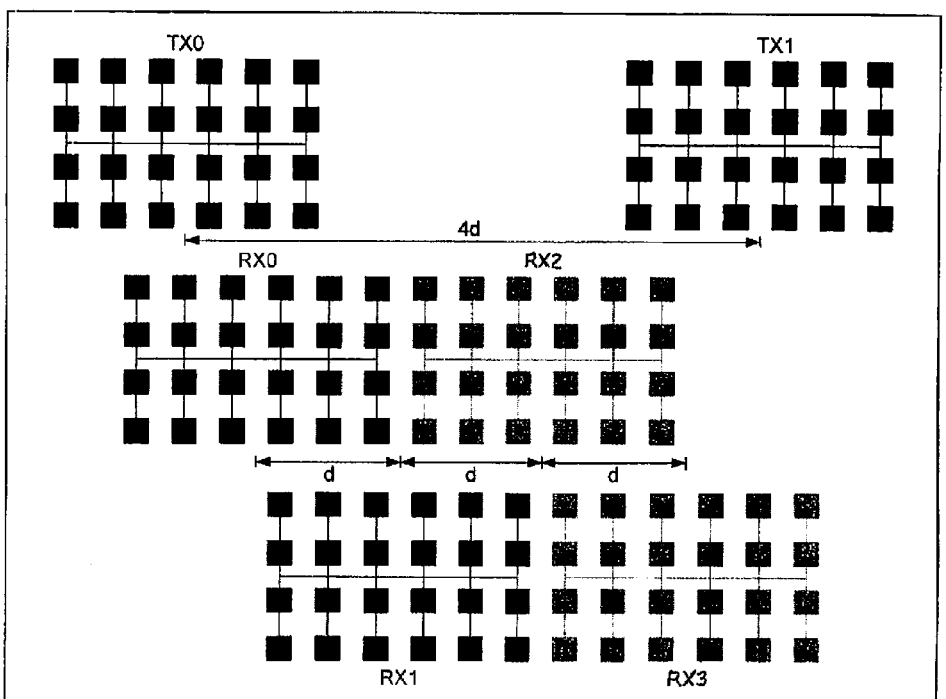
FIG. 22 shows the antenna assembly of a sixth form of embodiment of a radar system.

The horizontally successive receiver antennas are vertically offset in such an alternating manner that they lie in E different vertical planes; in the illustrated example according to FIG. 22 there are two planes, the alternating offset thus has the period length 2—the two receiver antennas RX0 and RX2 lie one plane above the other two receiver antennas RX1 and RX3. When using E different planes for the receiver antennas their horizontal width can be selected up to E-times larger than the distance d of horizontally successive receiver antennas. As a result of the vertical offset of the receiver antennas implicitly the above described elevation measuring capability ensues.

Figure 23:
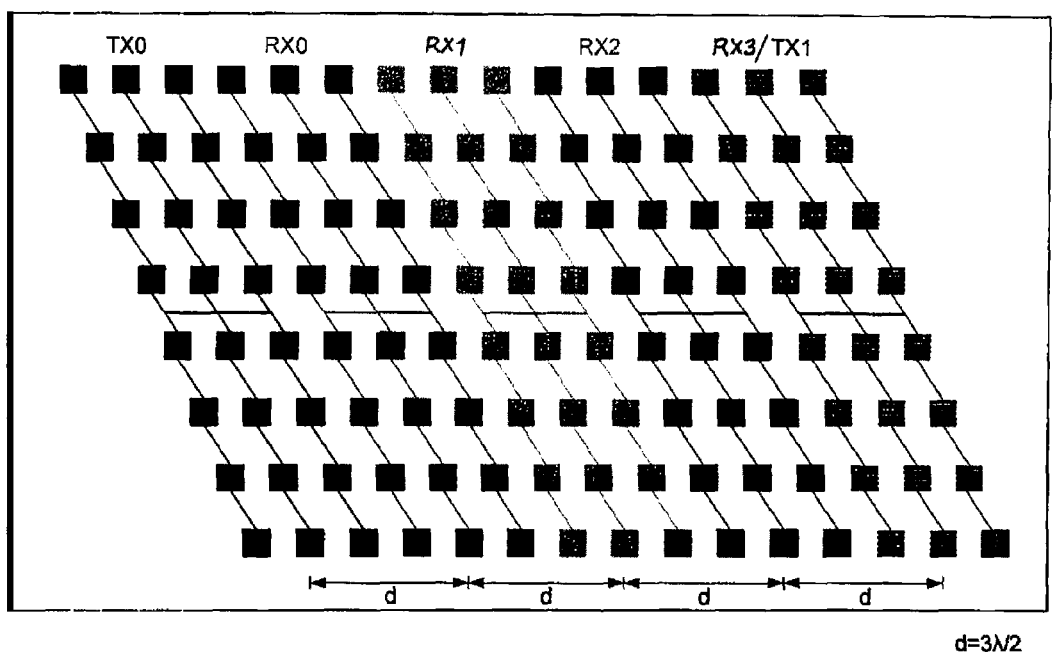
FIG. 23 shows the antenna assembly of a seventh form of embodiment of a radar system.

Transmitter and/or receiver antennas are not arranged vertically, but inclined to the horizontal (see FIG. 23 as an example, where one of the inclined antennas is used for transmission and reception). Thus the horizontal width of antennas can be made nearly arbitrary larger than its distance. However, the high focusing of the emission characteristic is only for elevation angles within the range of $0°$, i.e. for objects approximately in the horizontal plane—however, apart from the absolute close range at this place lie all objects relevant from the system point of view. For elevation angles significantly deviating from $0°$ there is less beam focusing in the horizontal direction, which can have a negative effect at best in the absolute close range and for objects located across the road. The smaller beam focusing for elevation angles deviating significantly from $0°$ can principally be avoided on system level by the fact that transmitter and receiver antennas are tilted in different directions (the ones to the right, the others to the left).

Figure 24A:
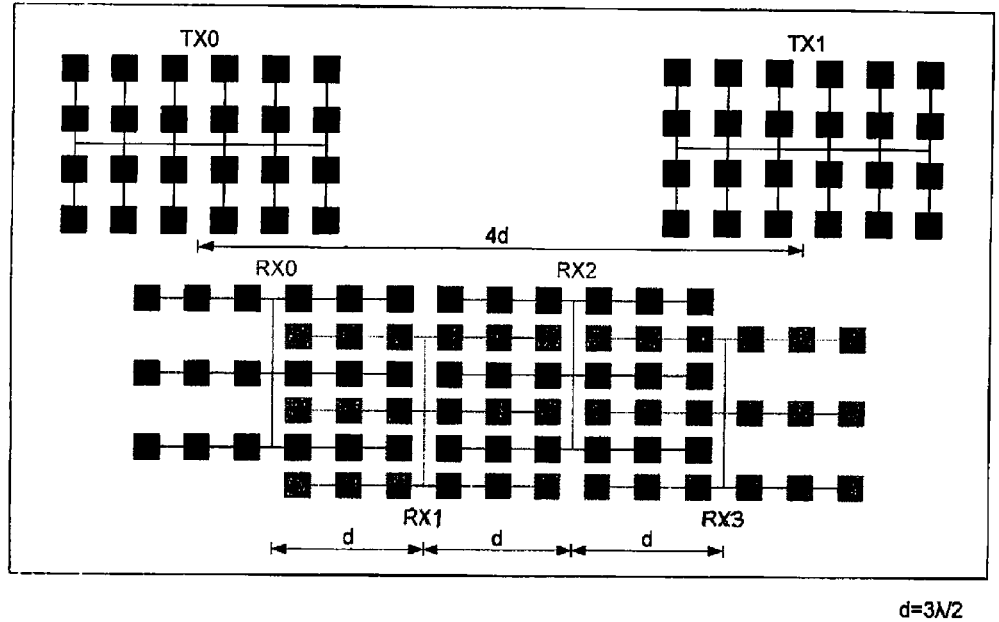
FIGS. 24a and 24b show two alternative antenna assemblies of an eighth form of embodiment of a radar system.
Figure 24B:
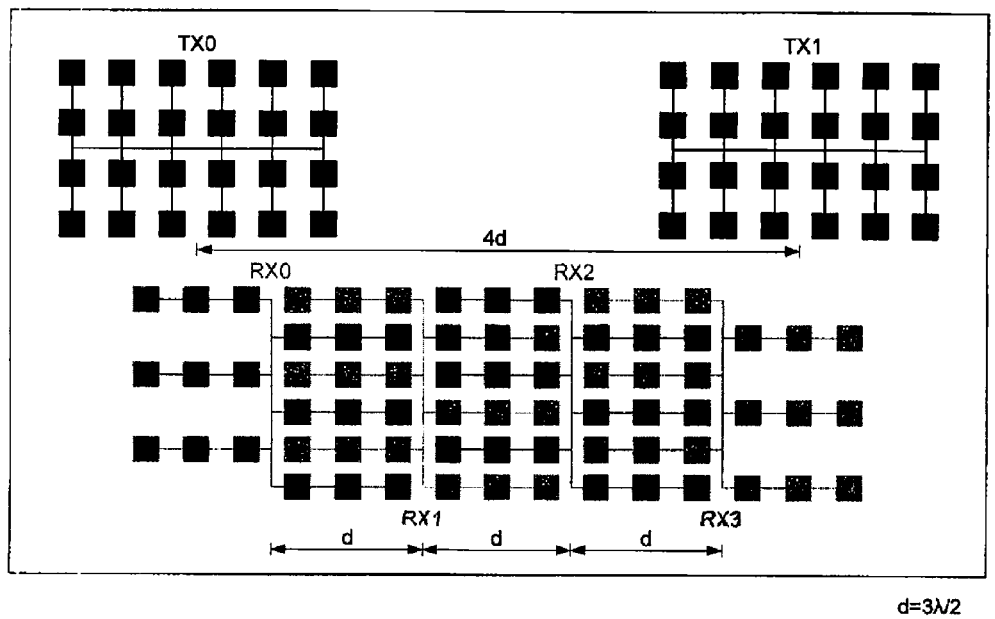

Antennas are locked into each other in horizontal direction (see as examples FIGS. 24*a* and 24*b*, where the receiver antennas are locked into each other). Thus the horizontal width of antennas can be made twice as large as their distance. The locking in the case of the arrangement according to FIG. 24*a* results in an offset of the antennas in vertical direction and thus implicitly in the above described elevation measuring capability, with the alternative antenna assembly according to FIG. 24*b* this is not the case. Instead of the locking shown in both examples from the side, it could be embodied also from above and/or from underneath.

Figure 25:
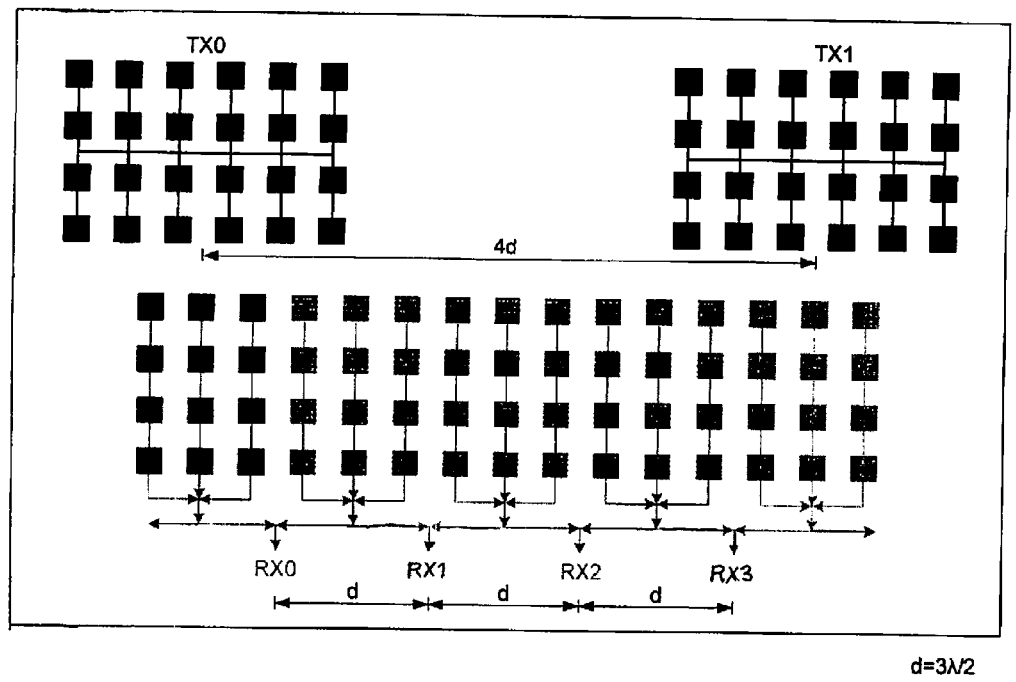
FIG. 25 shows the antenna assembly of a ninth form of embodiment of a radar system.

Emitting and/or receiving elements are jointly used at least by two antennas (see FIG. 25 as an example, where by two adjacent receiver antennas each three patch columns are jointly used and their received power is distributed to the two antennas). Theoretically, antennas can be made thereby nearly arbitrary wider than for their distance, however, in practice in this case the power distribution networks get more and more complicated, in particular because crossings of high frequency connections are difficult to be realized.

Without the approaches for the arrangement of the antennas, represented above, only a horizontal width of the antennas could be realized, which corresponds to its distance which would result in strongly pronounced ambiguities for the azimuth angle.

It should still be mentioned that the above antenna assemblies for remote range sensors always comprise two transmitter antennas on the outside and thereby the effective aperture of the sensor can be nearly doubled in relation to its width—by means of this also in the 24 GHz-range sensors for long-reach functions with an acceptable sensor size can be realized. In order to be able to receive received signals from objects up to a distance of 200 m, the linear frequency modulation in contrast to the interpretation for the embodiments 1 and 2 have only half the frequency deviation, i.e. 93.75 MHz.

Figure 26:
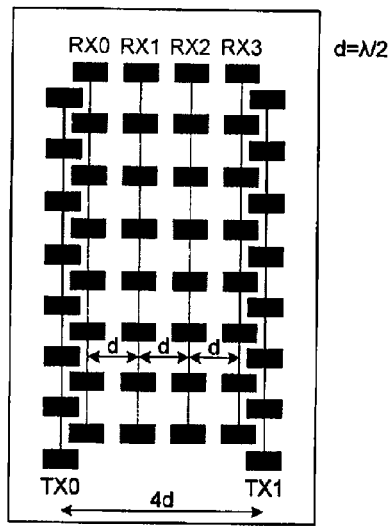
FIG. 26 shows the antenna assembly of a tenth form of embodiment of a radar system.

The above described methods for realizing an overlapping of antennas, in particular in horizontal direction, can be applied also for close range sensors. The embodiment 2 according to FIG. 10 is an example for an arrangement of the transmitter antennas above the receiver antennas (i.e. when seen vertically they are in different planes). In FIG. 26 a horizontal locking of the transmitter antennas with the receiver antennas is shown, by which a distance of $d/2=\lambda/4$ can be realized between the transmitter antennas and the respectively adjacent receiver antennas, whereby despite an arrangement of the transmitter and receiver antennas essentially in one plane no common transmitter and receiver antenna as in the arrangement 3 according to FIG. 12 is required.

Figure 27:
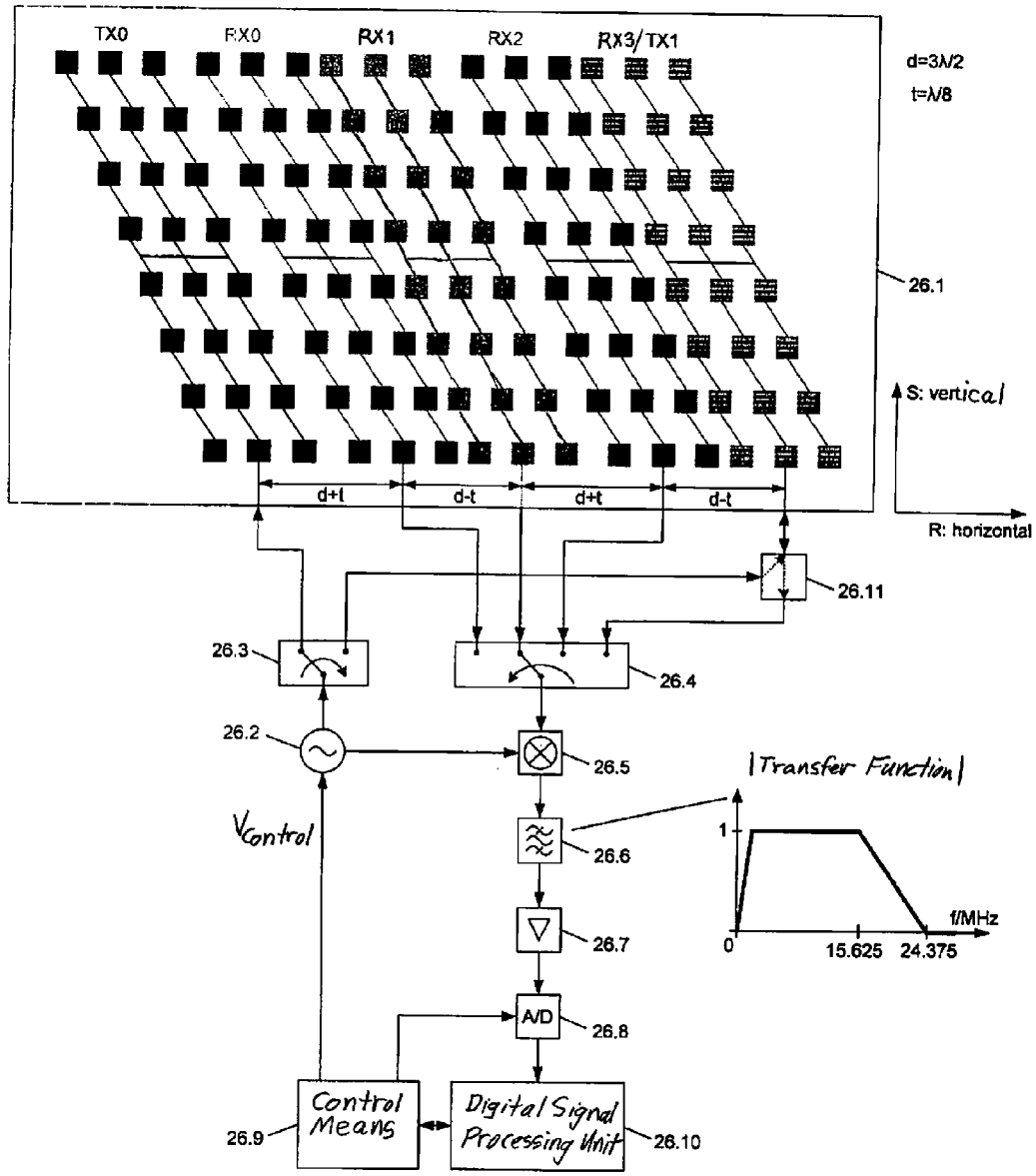
FIG. 27 shows the eleventh form of embodiment of a radar system.

Embodiment 11 According to FIG. 27

The measures represented above for reducing and/or avoiding ambiguities for the azimuth angular measurement with remote range sensors have led to a reduced azimuthal detection range. If, however, simultaneously long-reach and short-reach functions are to be realized now with a sensor, then a wide azimuthal detection range can be required (for example −80° . . . +80). This can be realized by the subsequently represented approach, which is explained on the basis of the embodiment 11 according to FIG. 27.

In contrast to the antenna configuration according to FIG. 23 with the configuration according to FIG. 27 considered now there are two differences: on the one hand the individual antennas significantly emit and/or receive also outside of the azimuthal range −19.5 . . . +19.5 by corresponding shoulders in the antenna diagram (see FIG. 28); such shoulders can be generated by the fact that patches in the central portion when seen horizontally of the individual antennas emit significantly more than the others, whereby a narrow and a wide antenna diagram are superimposed (by such an approach the antenna gain and thus the system sensitivity are reduced in the central portion, where a high reach is required, only relatively small). And on the other hand the two receiver antennas RX0 and RX2 are offset to the right by the horizontal distance t=λ/8, which is smaller by the factor 12 than the central horizontal offset d=3λ/2 of the receiver antennas. Thus the relative phase centers of the 8 antenna combinations do not lie equidistantly in horizontal direction, but they have an offset alternating with the period length 2 to an equidistant raster. For a far away object resting relative to the sensor with an azimuth angle $\alpha_{Az}$ therefore the phase φ(m) of the received signals has a portion alternating with the period length 2 in addition to a linear portion over the antenna combinations m=0, 1, . . . 7 and analogue to FIG. 7b this results in $$\phi(m)=\phi(0)+2\pi/\lambda \cdot \sin(\alpha_{Az}) \cdot (d \cdot m - t \cdot \mathrm{mod}(m,2)).$$

Provided that in the assigned distance-relative-speed-gate (j,l) there is only this object, the there complex values v(j,l,m) after the second DFT over the 8 antenna combinations m=0, 1, . . . 7 result in $$v(j,l,m)=K \cdot \exp[j \cdot (\phi(0)] \cdot \exp[j \cdot 2\pi/\lambda \cdot \sin(\alpha_{Az}) \cdot d \cdot m] \cdot \exp[-j \cdot 2\pi/\lambda \cdot \sin(\alpha_{Az}) \cdot t \cdot \mathrm{mod}(m,2)],$$

wherein K is the constant amount of these values.

Thus one receives analogue proportions as with the above considered elevation measuring capability by a vertical offset alternating with the period length 2 of the individual receiver antennas. By the factor $\exp[-j \cdot 2\pi/\lambda \cdot \sin(\alpha_{Az}) \cdot t \cdot \mathrm{mod}(m,2)]$, which is generated by the horizontal offset alternating with the period length 2 of the individual receiver antennas, the spectrum w(j,l,n) of v(j,l,m) formed in the third DFT has two power peaks—one power peak at the frequency $n_{Az}$ corresponding to the azimuth angle $\alpha_{Az}$ and one at the frequency $n_{Az}+N/2$ distanced by half the DFT-length, wherein for the proportion of the spectral values of these two power peaks it applies:

$$w(j,l,n_{Az})/w(j,l,n_{Az}+N/2)=(1+\exp[-j \cdot 2\pi/\lambda \cdot \sin(\alpha_{Az}) \cdot t])/(1-\exp[-j \cdot 2\pi/\lambda \cdot \sin(\alpha_{Az}) \cdot t]);$$

Figure 29:
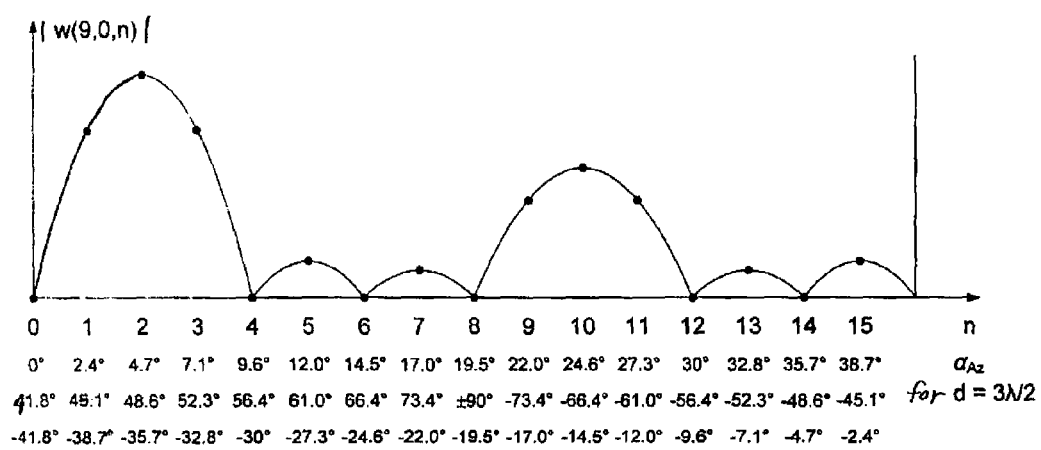
FIG. 29 shows for the eleventh form of embodiment a course of the amount of the spectrum after the third DFT with two power peaks distanced by half the DFT-length N=16 with n=2 and n=10.

FIG. 29 shows an exemplary course of the amount of the spectrum w(j,l,n) with two power peaks distanced by half the DFT-length N=16 with n=2 and n=10.

For all azimuth angles $\alpha_{Az}$ in the detection range −90° . . . +90° with the here considered t=λ/8 the proportion $w(j,l,n_{Az})/w(j,l,n_{Az}+N/2)$ with regard to the amount is larger than one.

Thus the frequency value $n=n_{Az}$ belonging to the azimuth angle $\alpha_{Az}$ can be determined as the position of the power peak being higher with regard to its amount; in the example according to FIG. 29 thus $n_{Az}=2$ results. However, with this the azimuth angle $\alpha_{Az}$ is not yet clearly defined, as to each $n=n_A$, three different values of $\alpha_{Az}$ correspond, this means in the example according to FIG. 29 still the three azimuth angles $\alpha_{Az}=4.7°$, 48.6° and −35.7° come into question. By transformation of the above relation (analogue to the above derivation for the elevation measuring capability), however, now the azimuth angle can be also determined from the proportion $w(j,l,n_{Az})/w(j,l,n_{Az}+N/2)$:

$$\alpha_{Az}=\arcsin(-\lambda/(\pi \cdot t) \cdot \arctan[j \cdot w(j,l,n_{Az}+N/2)/w(j,l,n_{Az})]).$$

As this relation for t=λ/8 is clear over the entire azimuthal detection range −90° . . . +90° (because of $2\pi/\lambda \cdot \sin(\alpha_{Az}) \cdot t \in ]-\pi/4, \pi/4[$), this allows for determining the right one of the three azimuth angles coming into question—the azimuth angle determination is thus clear for a single object in a distance-relative-speed-gate, wherein the ambiguity is generated via the alternating horizontal offset of the receiver antennas (without this offset it could not be distinguished in each case between three various azimuth angles).

If in a distance-relative-speed-gate there are reflections of several objects in different azimuth angles, which correspond to two frequency values n and n+N/2, then they generally can no longer be separated; by a then generally significant complex-valued portion in the size $j \cdot w(j,l,n_{Az}+N/2)/w(j,l,n_{Az})$ it can only be recognized that there are several of such objects and certain possible hypotheses can be derived. Which of this hypothesis is the right one, can be mostly recognized by plausibility considerations; examples for this are:

With the aid of the tracking (i.e. the observation of objects over several cycles) with objects moved relative to the sensor it can be recognized in general, which one of several possible hypothesis is the right one (e.g. only temporary a fusion on the same frequency values n and n+N/2 takes place and mostly only for one hypothesis a useful course of the object results).

Figure 28:
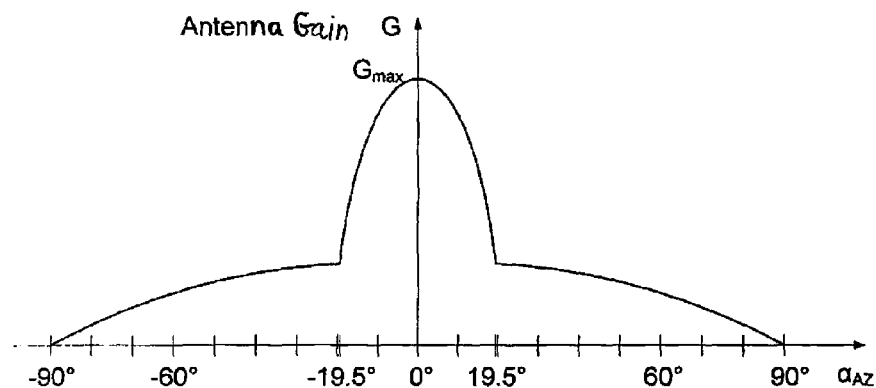
FIG. 28 shows an antenna diagram, which is sensitive by corresponding shoulders also outside of the azimuthal range −19.5 . . . +19.5.

By an antenna diagram as is represented in FIG. 28 of the individual antennas objects from the central portion with a high antenna gain generally have significantly more level than objects from the outer portion with a smaller antenna gain (shoulders), so that with the presence of an object in the middle and one in the outer portion the middle object dominates in the level and is therefore recognized with the proper azimuth angle, which is sufficient from functional view, since this middle object is then the relevant one.

The example according to FIG. 27 considered so far did not have a vertical offset in the receiver antennas and thus no elevation measuring capability. In principle also such a vertical offset can naturally be superimposed. If different period lengths are selected for the vertical and the horizontal offset, then their effects can be separated directly, so that azimuth and elevation angle for a single object in a distance-relative-speed-gate can be clearly determined; with the same period length corresponding plausibility considerations are necessary.

The explained approach for the clear measurement of the azimuth angle with widely emitting remote range sensors can be interpreted also in such a way that in the high-resolution and accurate, but ambiguous digital azimuth beam formation a mono-pulse method is incorporated for an azimuth angle determination which for a single object is clear but rough. This approach has the advantage that on the one hand all evaluation methods based on equidistant receiver antennas (such as e.g. the simple digital beam formation with a DFT) can be maintained and that on the other hand for the azimuth angle there are no losses for the accuracy and only small losses for the separation capability (the latter only with objects, which generate power peaks with identical frequency values n). In order to be able to determine the azimuth angle as accurate as possible from the higher of the two power peaks, an interpolation with adjacent power values can be performed and from this the interpolated maximum can be determined—as is already mentioned above.

It should be noted that the periodic horizontal offset of the antenna combinations can principally be also embodied with a higher period length Q than 2. By an object then generally Q power peaks with respective distance N/Q result in the spectrum, wherein N is the DFT-length of the digital beam formation; from the values of these power peaks again the azimuth angle can be clearly determined, wherein now even a separation capability of objects, which generate power peaks with identical frequency values n, will be possible. By such an approach two digital beam formations in a DFT are superimposed—the one is fine, but ambiguous, the other for single objects is clear, but rough.

It is to be stressed that the approach introduced here for a sensor for realizing short- and long-reach functions, is essentially cost-neutral.

It should be noted that the considerations and embodiments according to the invention represented on the basis of the above examples can be transferred to general calculations and parameter interpretations, i.e. they can be applied also for other numerical values (e.g. for the horizontal and vertical distance of the antennas). Therefore, often also general parameters are indicated in formulas and images apart from the concrete numerical values.

The invention claimed is:

1. A radar system for recording the environment of a motor vehicle, comprising:
   transmission means for emitting transmission signals using at least two transmitter antennas;
   receiving means for receiving transmission signals reflected by objects using one or more receiver antenna;
   and signal processing means for processing the received signals,
   characterized in that
   there are transmitter and receiver antennas that are planar and are situated on a level surface; said transmitter antennas all respectively have at least approximately the same first emission characteristic, said receiver antennas all respectively have at least approximately the same second emission characteristic, wherein the first emission characteristic can be different from the second emission characteristic;
   received signals are acquired from different combinations of the transmitter and receiver antennas;
   in the signal processing means, the angular position in a spatial direction R is estimated for objects from said received signals, using the fact that the received signals from an individual object have different phase positions in relation to one another depending on the angular position of said object in the spatial direction R;
   and at least two of said transmitter and receiver antennas overlap with regard to the spatial direction R without being identical, said overlap being obtained by at least one of the following arrangements or configurations of these transmitter and receiver antennas:
   a) the antennas are offset in relation to one another with regard to the spatial direction S that runs perpendicular to the spatial direction R which is a horizontal spatial direction R, whereby the transmitter antennas are positioned above the receiver antennas;
   b) the transmitter and/or the receiver antennas have an oblique sloping form with regard to the spatial direction R;
   c) the antennas are interleaved with regard to the spatial direction R;
   d) at least two antennas consist of a plurality of emitting or receiving elements, and emitting or receiving elements are used in common jointly by at least two transmitter or receiver antennas.

2. A radar system according to claim 1, in which the overlap from at least two of the transmitter and receiver antennas with regard to the spatial direction R results from the fact that for avoiding or reducing ambiguity effects during the angle estimation with regard to the spatial direction R correspondingly wide antennas are required for a corresponding narrow emission characteristic.

3. A radar system according to claim 1, in which transmitter and receiver antennas have an oblique form with regard to the spatial direction R, wherein the transmitter antennas are tilted towards the receiver antennas.

4. A radar system according to claim 1, in which several transmitter antennas (number of $N_S$) and several receiver antennas (number of $N_E$), which do not lie with regard to the spatial direction R outside of the outer of these $N_S$ transmitter antennas, each have at least approximately the same emission characteristic and with regard to their phase centers in the spatial direction R are each arranged at least approximately equidistant, wherein in this spatial direction R the distance of these $N_S$ transmitter antennas to each other is larger by the factor $N_E$ or $N_E-1$ than the distance of these $N_E$ receiver antennas to each other, whereby an arrangement with a transmitter antenna and maximum $N_S \cdot N_E$ receiver antennas equidistantly arranged in this spatial direction R is synthesized with an at least approximately identical emission characteristic.

5. A radar system according to claim 4, in which with regard to the spatial direction R the width of the $N_S$ transmitter antennas and/or the width of the $N_E$ receiver antennas is larger than the distance of the $N_E$ receiver antennas to each other.

6. A radar system for recording the environment of a motor vehicle, comprising:
   transmission means for emitting transmission signals using at least two transmitter antennas;
   receiving means for receiving transmission signals reflected by objects using one or more receiver antenna;
   and signal processing means for processing the received signals,
   characterized in that
   there are transmitter and receiver antennas that are planar and are situated on a level surface; said transmitter antennas all respectively have at least approximately the same first emission characteristic, said receiver antennas all respectively have at least approximately the same second emission characteristic, wherein the first emission characteristic can be different from the second emission characteristic;
   received signals are acquired from different combinations of the transmitter and receiver antennas;
   in the signal processing means, the angular position in a spatial direction R is estimated for objects from said received signals, using the fact that the received signals from an individual object have different phase positions in relation to one another depending on the angular position of said object in the spatial direction R;

and at least two of said transmitter and receiver antennas overlap with regard to the spatial direction R without being identical, said overlap being obtained by at least one of the following arrangements or configurations of these transmitter and receiver antennas:
a) the antennas are offset in relation to one another with regard to the spatial direction S that runs perpendicular to the spatial direction R, in particular the transmitter antennas are positioned above the receiver antennas for a horizontal spatial direction R;
b) the transmitter and/or the receiver antennas have an oblique form with regard to the spatial direction R;
c) the antennas are interleaved with regard to the spatial direction R;
d) the use of emitting or receiving elements is common to at least two transmitter or receiver antennas, in which several transmitter antennas (number of $N_S$) and several receiver antennas (number of $N_E$), which do not lie with regard to the spatial direction R outside of the outer of these $N_S$ transmitter antennas, each have at least approximately the same emission characteristic and with regard to their phase centers in the spatial direction R are each arranged at least approximately equidistant, wherein in this spatial direction R the distance of these $N_S$ transmitter antennas to each other is larger by the factor $N_E$ or $N_E-1$ than the distance of these $N_E$ receiver antennas to each other, whereby an arrangement with a transmitter antenna and maximum $N_S \cdot N_E$ receiver antennas equidistantly arranged in this spatial direction R is synthesized with an at least approximately identical emission characteristic, and in which
received signals from different combinations of the $N_S$ transmitter and of the $N_E$ receiver antennas are acquired, wherein for each combination a relative phase center is defined as a sum of the two vectors from a reference point to the phase centers of the respective transmitter and of the respective receiver antenna and the relative phase centers of these combinations of transmitter and receiver antennas lie at least approximately equidistant with regard to the spatial direction R, with regard to the spatial direction S which runs perpendicular to the spatial direction R the position of the relative phase centers of these combinations of transmitter and receiver antennas varies periodically with the period length P, if a sequence of these combinations of transmitter and receiver antennas is considered, which is arranged in the spatial direction R with regard to the position of the relative phase centers, and in the signal processing means it is utilized that the received signals of an object dependent on its angular position in the spatial direction S have a phase portion alternating periodically with the period length P over the combinations of transmitter and receiver antennas arranged in such manner, whereby for this spatial direction S assertions regarding the angular position of objects and/or regarding the misalignment of the radar system are possible.

7. A radar system according to claim 6, in which the spatial direction R lies horizontally and the spatial direction S lies vertically, and in the signal processing means, for recognizing in particular stationary objects which can be driven over or under, a measure is used, which utilizes at least one deviation in relation to the proportions resulting with received signals from only one elevation angle, wherein in connection with the reflecting property of road surfaces the size and/or the amount, in particular filtered in each case over the object distance, and/or the distance-related variation of this measure is used for an at least rough estimate of the height of objects above the road surface.

8. A radar system for recording the environment of a motor vehicle, comprising:
transmission means for emitting transmission signals using at least two transmitter antennas;
receiving means for receiving transmission signals reflected by objects using one or more receiver antenna;
and signal processing means for processing the received signals, characterized in that
there are transmitter and receiver antennas that are planar and are situated on a level surface; said transmitter antennas all respectively have at least approximately the same first emission characteristic, said receiver antennas all respectively have at least approximately the same second emission characteristic, wherein the first emission characteristic can be different from the second emission characteristic;
received signals are acquired from different combinations of the transmitter and receiver antennas;
in the signal processing means, the angular position in a spatial direction R is estimated for objects from said received signals, using the fact that the received signals from an individual object have different phase positions in relation to one another depending on the angular position of said object in the spatial direction R;
and at least two of said transmitter and receiver antennas overlap with regard to the spatial direction R without being identical, said overlap being obtained by at least one of the following arrangements or configurations of these transmitter and receiver antennas:
a) the antennas are offset in relation to one another with regard to the spatial direction S that runs perpendicular to the spatial direction R, in particular the transmitter antennas are positioned above the receiver antennas for a horizontal spatial direction R;
b) the transmitter and/or the receiver antennas have an oblique form with regard to the spatial direction R;
c) the antennas are interleaved with regard to the spatial direction R;
d) the use of emitting or receiving elements is common to at least two transmitter or receiver antennas, in which
received signals from different combinations of transmitter and receiver antennas are acquired, wherein for each combination a relative phase center is defined as a sum of the two vectors from a reference point to the phase centers of the respective transmitter and of the respective receiver antenna,
transmitter and receiver antennas used thereby each have at least approximately the same emission characteristic, wherein the emission characteristic of these transmitter antennas can be different from the emission characteristic of these receiver antennas,
with regard to the spatial direction R the position of the relative phase centers of these combinations of transmitter and receiver antennas varies periodically with the period length Q by an equidistant raster, and
in the signal processing means, for determining the position of objects in the spatial direction R, it is utilized that the received signals of an object dependent on its angular position in the spatial direction R apart from a linear phase portion have a phase portion alternating with the period length Q, if a sequence of the combinations of transmitter and receiver antennas ordered in the spatial direction R with regard to the position of the relative phase centers is considered.

* * * * *

UNITED STATES PATENT AND TRADEMARK OFFICE
CERTIFICATE OF CORRECTION

PATENT NO. : 8,436,763 B2
APPLICATION NO. : 12/994755
DATED : May 7, 2013
INVENTOR(S) : Markus Wintermantel Page 1 of 1

It is certified that error appears in the above-identified patent and that said Letters Patent is hereby corrected as shown below:

In the Specification

Column 9,

Line 43, the formula should read -- $\alpha_{Az} = \arcsin(\Delta\varphi \cdot \lambda/(2\pi d)) = \arcsin(n \cdot \lambda/(16d))$ --;
Line 50, the formula after "angle" should read -- $\alpha_{Az} = \arcsin(\pi/4) = 14.5°$ --;

Column 15,
Lines 35 and 36, the formula after "range" should read
-- $]-\arcsin(\lambda/(2s), +\arcsin(\lambda/(2s)[$ --;

Column 22,
Line 15, the formula should read
-- $\alpha_{Az} = \arcsin(-\lambda/(\pi \cdot t) \cdot \arctan[j \cdot w(j,l,n_{Az}+N/2) / w(j,l,n_{Az})])$ --.

Signed and Sealed this
Twenty-sixth Day of November, 2013

Margaret A. Focarino
*Commissioner for Patents of the United States Patent and Trademark Office*